US011950080B2

(12) United States Patent
Chung et al.

(10) Patent No.: US 11,950,080 B2

(45) **Date of Patent: *Apr. 2, 2024**

(54) METHOD AND DEVICE FOR PROCESSING AUDIO SIGNAL, USING METADATA

(71) Applicant: GAUDIO LAB, INC., Seoul (KR)

(72) Inventors: Hyunjoo Chung, Seoul (KR); Sangbae Chon, Seoul (KR)

(73) Assignee: GAUDIO LAB, INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/992,944

(22) Filed: Nov. 23, 2022

(65) Prior Publication Data

US 2023/0091281 A1 Mar. 23, 2023

Related U.S. Application Data

(63) Continuation of application No. 17/046,302, filed as application No. PCT/KR2019/004248 on Apr. 10, 2019, now Pat. No. 11,540,075.

(30) Foreign Application Priority Data

Apr. 10, 2018 (KR) ........................ 10-2018-0041394
Jul. 5, 2018 (KR) ........................ 10-2018-0078449

(Continued)

(51) Int. Cl.

*H04S 3/00* (2006.01)
*G10L 19/008* (2013.01)
*H04S 7/00* (2006.01)

(52) U.S. Cl.

CPC ............ *H04S 3/008* (2013.01); *G10L 19/008* (2013.01); *H04S 7/30* (2013.01); *H04S 2400/01* (2013.01);

(Continued)

(58) Field of Classification Search

CPC ... G10L 19/008; G10L 19/032; G10L 19/167; G10L 19/20; H04S 2400/11;

(Continued)

(56) References Cited

U.S. PATENT DOCUMENTS 9,558,785 B2 * 1/2017 Johnson ........... G11B 20/10527
10,278,000 B2 * 4/2019 Breebaart ................. H04S 7/30

(Continued)

FOREIGN PATENT DOCUMENTS

JP 2015-534656 12/2015
JP 2016-534586 11/2016

(Continued)

OTHER PUBLICATIONS

Office Action dated Apr. 10, 2023 for Japanese Patent Application No. 2022-104743 and its English translation provided by Applicant's foreign counsel.

(Continued)

*Primary Examiner* — Alexander Krzystan

(74) *Attorney, Agent, or Firm* — Ladas & Parry, LLP

(57) ABSTRACT

Disclosed is a device for processing an audio signal, which renders an audio signal. The device for processing an audio signal includes a processor. The processor receives metadata including an audio signal and first element reference distance information and renders a first element signal on the basis of the first element reference distance information, wherein the first element reference distance information indicates the reference distance of an element signal. The audio signal is capable of including a second element signal which may be simultaneously rendered with the first element signal, and the metadata is capable of including second element distance information indicating the distance of the second element signal. The number of bits required for representing the first element reference distance information (Continued)

is smaller than the number of bits required for representing the second element distance information.

17 Claims, 12 Drawing Sheets

(30) Foreign Application Priority Data

Jul. 9, 2018 (KR) ........................ 10-2018-0079649
Jul. 12, 2018 (KR) ........................ 10-2018-0080911
Jul. 19, 2018 (KR) ........................ 10-2018-0083819

(52) U.S. Cl.
CPC ....... *H04S 2400/13* (2013.01); *H04S 2420/11* (2013.01)

(58) Field of Classification Search
CPC .......... H04S 2420/03; H04S 3/02; H04S 7/30; H04S 2420/11
USPC ................. 700/94; 381/310, 303, 12, 22, 23
See application file for complete search history.

(56) References Cited

U.S. PATENT DOCUMENTS

| | | | | |
|---|---|---|---|---|
| 11,070,931 | B2 | 7/2021 | Walker et al. | |
| 2004/0228498 | A1 | 11/2004 | Sekine | |
| 2010/0254679 | A1* | 10/2010 | Sasaki | H04N 9/8227 386/239 |
| 2011/0129198 | A1* | 6/2011 | Toma | H04N 13/161 348/43 |
| 2014/0303984 | A1 | 10/2014 | Johnson et al. | |
| 2015/0230040 | A1* | 8/2015 | Squires | H04S 7/302 381/303 |
| 2016/0133263 | A1* | 5/2016 | Borss | H04S 3/02 381/23 |
| 2016/0286333 | A1* | 9/2016 | Robinson | H04R 3/12 |
| 2017/0011751 | A1 | 1/2017 | Fueg et al. | |
| 2017/0171687 | A1 | 6/2017 | Breebaart et al. | |
| 2017/0366914 | A1 | 12/2017 | Stein et al. | |
| 2021/0084426 | A1* | 3/2021 | Chung | H04S 7/304 |

FOREIGN PATENT DOCUMENTS

| | | |
|---|---|---|
| JP | 7102024 | 7/2022 |
| KR | 10-2014-0000240 | 1/2014 |
| KR | 10-2014-0092779 | 7/2014 |
| WO | 2014/192602 | 12/2014 |

OTHER PUBLICATIONS

Office Action dated Jun. 19, 2023 for Korean Patent Application No. 10-2019-7033407 and its English translation provided by Applicant's foreign counsel.
International Search Report for PCT/KR2019/004248 dated Jul. 19, 2019 and its English translation from WIPO (now published as WO 2019/199040).
Written Opinion of the International Searching Authority for PCT/KR2019/004248 dated Jul. 19, 2019 and its English translation by Google Translate (now published as WO 2019/199040).
Jackson, Philip et al. "Object-Based Audio Rendering", University of Surrey, Aug. 24, 2017, pp. 1, 15-16.
Office Action dated Dec. 6, 2021 for Japanese Patent Application No. 2020- 554183 and its English translation provided by Applicant's foreign counsel.
Notice of Allowance dated Oct. 25, 2021 for Chinese Patent Application No. 201980024365.9 and its English translation provided by Applicant's foreign counsel.
Notice of Allowance dated Aug. 24, 2022 for U.S. Appl. No. 17/046,302 (now published as 2021/0084426).
Office Action dated Apr. 21, 2022 for U.S. Appl. No. 17/046,302 (now published as 2021/0084426).
Final Office Action dated Jan. 26, 2022 for U.S. Appl. No. 17/046,302 (now published as 2021/0084426).
Office Action dated Sep. 13, 2021 for U.S. Appl. No. 17/046,302 (now published as 2021/0084426).
Notice of Allowance dated Sep. 19, 2023 for Japanese Patent Application No. 2022-104743 and its English translation provided by Applicant's foreign counsel.

* cited by examiner

| Syntax | No. of bits | Mnemonic |
|---|---|---|
| prodMetadataConfig() | | |
| { | | |
| /* high resolution reference distance */ | | |
| **has_reference_distance;** | 1 | **Bslbf** |
| if (has_reference_distance==0) { | | |
| bs_reference_distance = 11; | | |
| } | | |
| /* high resolution object distance */ | | |
| for (gp = 0; gp < numObjectGroups; gp++ ) { /* NOTE 1 */ | | |
| **has_object_distance[gp];** | 1 | **bslbf** |
| } | | |
| /* direct to headphone */ | | |
| for (gp = 0; gp < numChannelGroups; gp++ ) { /* NOTE 2 */ | | |
| **directHeadphone[gp];** | 1 | **bslbf** |
| } | | |
| } | | |
| NOTE 1: numObjectGroups represents the number of signal groups with signalGroupType == SignalGroupTypeObject as given by the Signals3d() structure<br>NOTE 2: numChannelGroups represents the number of signal groups with signalGroupType == SignalGroupTypeChannel as given by the Signals3d() structure | | |

(a)

| Syntax | No. of bits | Mnemonic |
|---|---|---|
| prodMetadataFrame () | | |
| { | | |
| if (has_reference_distance) { | | |
| **reference_distance;** | 6 | **tcimsbf** |
| } | | |
| for ( gp = 0; gp < numObjectGroups; gp++ ) { /* NOTE 1 */ | | |
| if ( has_object_distance [gp] ) { | | |
| **has_intracoded_data;** | 1 | **bslbf** |
| if (has_intracoded_data) { | | |
| intracodedProdMetadataFrame(); | | |
| } | | |
| else { | | |
| dynamicProdMetadataFrame(); | | |
| } | | |
| } | | |
| } | | |
| } | | |
| NOTE 1: numObjectGroups represents the number of signal groups with signalGroupType == SignalGroupTypeObject as given by the Signals3d() | | |

(b)

| Syntax | No. of bits | Mnemonic |
|---|---|---|
| goa_Production_Metadata() | | |
| { | | |
| /* PRODUCTION METADATA CONFIGURATION */ | | |
| **goa_hasReferenceDistance;** | 1 | **bslbf** |
| if (goa_hasReferenceDistance) { | | |
| **goa_bsReferenceDistance;** | 6 | **Bslbf** |
| } | | |
| else { | | |
| goa_bsReferenceDistance = 11; | | |
| } | | |
| **goa_ hasObjectDistance;** | 1 | **bslbf** |
| if (goa_hasObjectDistance) { | | |
| for ( o = 0; o < goa_numberOfOutputObjects; o++ ) { | | |
| **goa_bsObjectDistance[o]** | 8 | **uimsbf** |
| } | | |
| } | | |
| } | | |

(c)

*FIG. 3*

| Syntax | No. of bits | Mnemonic |
|---|---|---|
| prodMetadataConfig() | | |
| { | | |
| /* high resolution reference distance */ | | |
| **has_reference_distance;** | **1** | **bslbf** |
| if (has_reference_distance) { | | |
| **bs_reference_distance;** | **6** | **uimsbf** |
| } else { | | |
| bs_reference_distance = 63; | | |
| } | | |
| /* high resolution object distance */ | | |
| for (gp = 0; gp < numObjectGroups; gp++ ) { /* NOTE 1 */ | | |
| **has_object_distance[gp];** | **1** | **bslbf** |
| } | | |
| /* direct to headphone */ | | |
| for (gp = 0; gp < numChannelGroups; gp++ ) { /* NOTE 2 */ | | |
| **directHeadphone[gp];** | **1** | **bslbf** |
| } | | |
| } | | |
| NOTE 1: numObjectGroups represents the number of signal groups with signalGroupType == SignalGroupTypeObject as given by the Signals3d() structure<br>NOTE 2: numChannelGroups represents the number of signal groups with signalGroupType == SignalGroupTypeChannel as given by the Signals3d() structure | | |

*FIG. 4*

| Syntax | No. of bits | Mnemonic |
|---|---|---|
| intracodedProdMetadataFrame (); | | |
| { | | |
| if (num_objects>1) { /* NOTE 1 */ | | |
| **fixed_distance;** | **1** | **bslbf** |
| if (fixed_distance) { | | |
| **default_distance;** | **8** | **tcimsbf** |
| } | | |
| else { | | |
| **common_distance;** | **1** | **bslbf** |
| if (common_distance) { | | |
| **default_distance;** | **8** | **tcimsbf** |
| } | | |
| else { | | |
| for (o = 0; o < num_objects; o++) { | | |
| **position_distance**[o]; | **8** | **tcimsbf** |
| } | | |
| } | | |
| } | | |
| } | | |
| else { | | |
| **position_distance**[0]; | **8** | **tcimsbf** |
| } | | |
| } | | |
| NOTE 1: num_objects is equal to the number of objects in the associated signal group. | | |

*FIG. 5*

```
Syntax                                                        No. of bits   Mnemonic
dynamicProdMetadataFrame () {
        flag_dist_absolute;                                   1             bslbf
        for (o = 0; o < num_objects; o++) {
        /* NOTE 1 */
                if (has_object_metadata) {
                /* NOTE 2 */
                        singleDynamicProdMetadataFrame(flag_dist_absolute);
                }
        }
}
NOTE 1: num_objects is equal to the number of objects in the associated signal group.
NOTE 2: has_object_metadata is given by the dynamic_object_metadata() structure
```

(a)

```
Syntax                                                        No. of bits         Mnemonic
singleDynamicProdMetadataFrame(flag_dist_absolute) {
        if (flag_dist_absolute) {
                if (!fixed_distance) {     /* NOTE 1 */
                        position_distance;                    8                   tclmsbf
                }
        else {
                if (!fixed_distance) {     /* NOTE 1 */
           flag_distance;                                     1                   bslbf
           if (flag_distance) {
               nBitsDistance;                                 3                   uimsbf
               num_bits = nBitsDistance + 2;
               position_distance_difference;                  min(num_bits,2)     tclmsbf
           }
                }
        }
}
NOTE 1:  fixed_distance given in the preceding intracodedProdMetadataFrame()
```

(b)

FIG. 6

| Syntax | No. of bits | Mnemonic |
|---|---|---|
| goa_Production_Metadata() | | |
| { | | |
| /* PRODUCTION METADATA CONFIGURATION */ | | |
| **goa_ hasObjectDistance;** | 1 | bslbf |
| if (goa_hasObjectDistance) { | | |
| for ( o = 0; o < goa_numberOfOutputObjects; o++ ) { | | |
| **goa_bsObjectDistance[o]** | 8 | uimsbf |
| } | | |
| } | | |
| } | | |

(a)

| Syntax | No. of bits | Mnemonic |
|---|---|---|
| gca_Production_Metadata() | | |
| { | | |
| /* PRODUCTION METADATA CONFIGURATION */ | | |
| for (gp = 0; gp < numChannelGroups; gp++ ) { | | |
| **gca_directHeadphone[gp]** | 1 | bslbf |
| } | | |
| **gca_hasReferenceDistance;** | 1 | bslbf |
| if (gca_hasReferenceDistance) { | | |
| **gca_bsReferenceDistance;** | 6 | uimsbf |
| } else { | | |
| gca_bsReferenceDistance = 26; | | |
| } | | |
| } | | |

(b)

| Syntax | No. of bits | Mnemonic |
|---|---|---|
| gha_Production_Metadata() | | |
| { | | |
| /* PRODUCTION METADATA CONFIGURATION */ | | |
| **gha_hasReferenceDistance;** | | |
| if (gha_hasReferenceDistance) { | | |
| **gha_bsReferenceDistance;** | 1 | bslbf |
| } | | |
| else { | 6 | uimsbf |
| gha_bsReferenceDistance = 26; | | |
| } | | |
| } | | |

(c)

*FIG. 7*

| Bit | Ch Reference Distance | Obj Distance Index |
|---|---|---|
| 0 | 0.496013553 | 31 |
| 1 | 0.528029458 | 33 |
| 2 | 0.560049899 | 35 |
| 3 | 0.592075821 | 37 |
| 4 | 0.640127541 | 40 |
| 5 | 0.688199124 | 43 |
| 6 | 0.73629709 | 46 |
| 7 | 0.784430097 | 49 |
| 8 | 0.848682348 | 53 |
| 9 | 0.913056028 | 57 |
| 10 | 0.977606995 | 61 |
| 11 | 1.042416795 | 65 |
| 12 | 1.123979303 | 70 |
| 13 | 1.206495765 | 75 |
| 14 | 1.290543174 | 80 |
| 15 | 1.394760885 | 86 |
| 16 | 1.505271098 | 92 |
| 17 | 1.626881837 | 98 |
| 18 | 1.742655588 | 103 |
| 19 | 1.880075827 | 108 |
| 20 | 2.014161633 | 112 |
| 21 | 2.18049086 | 116 |
| 22 | 2.335088273 | 119 |
| 23 | 2.524672723 | 122 |
| 24 | 2.6760269 | 124 |
| 25 | 2.852243303 | 126 |
| 26 | 3.058500634 | 128 |
| 27 | 3.174802104 | 129 |
| 28 | 3.301056299 | 130 |
| 29 | 3.438250779 | 131 |
| 30 | 3.587471098 | 132 |
| 31 | 3.74991052 | 133 |
| 32 | 3.926880714 | 134 |
| 33 | 4.1198235 | 135 |
| 34 | 4.330323759 | 136 |
| 35 | 4.560123637 | 137 |
| 36 | 4.811138141 | 138 |
| 37 | 5.085472298 | 139 |
| 38 | 5.385440005 | 140 |
| 39 | 5.713584754 | 141 |
| 40 | 6.07270242 | 142 |
| 41 | 6.465866296 | 143 |
| 42 | 6.896454624 | 144 |
| 43 | 7.368180853 | 145 |
| 44 | 7.885126899 | 146 |
| 45 | 8.451779708 | 147 |
| 46 | 9.073071442 | 148 |
| 47 | 9.75442366 | 149 |
| 48 | 10.50179588 | 150 |
| 49 | 11.32173894 | 151 |
| 50 | 12.2214537 | 152 |
| 51 | 13.20885553 | 153 |
| 52 | 14.29264519 | 154 |
| 53 | 15.48238678 | 155 |
| 54 | 16.78859341 | 156 |
| 55 | 18.22282134 | 157 |
| 56 | 19.7977735 | 158 |
| 57 | 21.5274133 | 159 |
| 58 | 23.42708964 | 160 |
| 59 | 25.51367443 | 161 |
| 60 | 27.80571371 | 162 |
| 61 | 30.32359372 | 163 |
| 62 | 33.08972357 | 164 |
| 63 | 36.12873589 | 165 |

*FIG. 8*

| Syntax | No. of bits | Mnemonic |
|---|---|---|
| prodMetadataConfig() | | |
| { | | |
| /* high resolution reference distance */ | | |
| **has_reference_distance**; | 1 | bslbf |
| if (has_reference_distance) { | | |
| **bs_reference_distance**; | 7 | uimsbf |
| } else { | | |
| **bs_reference_distance** = 57; | | |
| } | | |
| /* high resolution object distance */ | | |
| for (gp = 0; gp < numObjectGroups; gp++ ) { /* NOTE 1 */ | | |
| **has_object_distance**[gp]; | 1 | bslbf |
| } | | |
| /* direct to headphone */ | | |
| for (gp = 0; gp < numChannelGroups; gp++ ) { /* NOTE 2 */ | | |
| **directHeadphone**[gp]; | 1 | bslbf |
| } | | |
| } | | |
| NOTE 1: numObjectGroups represents the number of signal groups with signalGroupType == SignalGroupTypeObject as given by the Signals3d() structure in Table 14.<br>NOTE 2: numChannelGroups represents the number of signal groups with signalGroupType == SignalGroupTypeChannel as given by the Signals3d() structure in Table 14. | | |

*FIG. 9*

| Syntax | No. of bits | Mnemonic |
|---|---|---|
| intracodedProdMetadataFrame (); | | |
| { | | |
| if (num_objects>1) { /* NOTE 1 */ | | |
| **fixed_distance;** | 1 | bslbf |
| if (fixed_distance) { | | |
| **default_distance;** | 9 | tcimsbf |
| } | | |
| else { | | |
| **common_distance;** | 1 | bslbf |
| if (common_distance) { | | |
| **default_distance;** | 9 | tcimsbf |
| } | | |
| else { | | |
| for (o = 0; o < num_objects; o++) { | | |
| **position_distance**[o]; | 9 | tcimsbf |
| } | | |
| } | | |
| } | | |
| } | | |
| else { | | |
| **position_distance[0];** | 9 | tcimsbf |
| } | | |
| } | | |
| NOTE 1: num_objects is equal to the number of objects in the associated signal group. | | |

*FIG. 10*

| Syntax | No. of bits | Mnemonic |
|---|---|---|
| singleDynamicProdMetadataFrame(flag_dist_absolute) { | | |
| if (flag_dist_absolute) { | | |
| if (!fixed_distance) { /* NOTE 1 */ | | |
| **position_distance**; | 9 | tcimsbf |
| } | | |
| else { | | |
| if (!fixed_distance) { /* NOTE 1 */ | | |
| **flag_distance;** | 1 | bslbf |
| if (flag_distance) { | | |
| **nBitsDistance;** | 3 | uimsbf |
| num_bits = nBitsDistance + 2; | | |
| **position_distance_difference;** | min(num_bits,2) | tcimsbf |
| } | | |
| } | | |
| } | | |
| } | | |
| NOTE 1: fixed_distance given in the preceding intracodedProdMetadataFrame() | | |

*FIG. 11*

| Syntax | No. of bits | Mnemonic |
|---|---|---|
| goa_Production_Metadata() | | |
| { | | |
| /* PRODUCTION METADATA CONFIGURATION */ | | |
| **goa_ hasObjectDistance;** | **1** | **bslbf** |
| if (goa_hasObjectDistance) { | | |
| for ( o = 0; o < goa_numberOfOutputObjects; o++ ) { | | |
| **goa_bsObjectDistance**[o] | **9** | **uimsbf** |
| } | | |
| } | | |
| } | | |

(a)

| Syntax | No. of bits | Mnemonic |
|---|---|---|
| gca_Production_Metadata() | | |
| { | | |
| /* PRODUCTION METADATA CONFIGURATION */ | | |
| for (gp = 0; gp < numChannelGroups; gp++ ) { | | |
| **gca_directHeadphone**[gp] | **1** | **bslbf** |
| } | | |
| **gca_hasReferenceDistance;** | **1** | **bslbf** |
| if (gca_hasReferenceDistance) { | | |
| **gca_bsReferenceDistance;** | **7** | **uimsbf** |
| } else { | | |
| **gca_bsReferenceDistance** = 57; | | |
| } | | |
| } | | |

(b)

| Syntax | No. of bits | Mnemonic |
|---|---|---|
| gha_Production_Metadata() | | |
| { | | |
| /* PRODUCTION METADATA CONFIGURATION */ | | |
| **gha_hasReferenceDistance;** | | |
| if (gha_hasReferenceDistance) { | | |
| **gha_bsReferenceDistance;** | **1** | **bslbf** |
| } | | |
| else { | **7** | **uimsbf** |
| gha_bsReferenceDistance = 57; | | |
| } | | |
| } | | |

(c)

*FIG. 12*

METHOD AND DEVICE FOR PROCESSING AUDIO SIGNAL, USING METADATA

CROSS-REFERENCE TO RELATED APPLICATIONS

This application is a continuation of U.S. patent application Ser. No. 17/046,302 filed on Oct. 8, 2020, which is the U.S. National Stage of International Patent Application No. PCT/KR2019/004248 filed on Apr. 10, 2019, which claims the priority to Korean Patent Application No. 10-2018-0041394 filed in the Korean Intellectual Property Office on Apr. 10, 2018, Korean Patent Application No. 10-2018-0078449 filed in the Korean Intellectual Property Office on Jul. 5, 2018, Korean Patent Application No. 10-2018-0079649 filed in the Korean Intellectual Property Office on Jul. 9, 2018, Korean Patent Application No. 10-2018-0080911 filed in the Korean Intellectual Property Office on Jul. 12, 2018, and Korean Patent Application No. 10-2018-0083819 filed in the Korean Intellectual Property Office on Jul. 19, 2018, the entire contents of which are incorporated herein by reference.

TECHNICAL FIELD

The present invention relates to a method and a device for processing an audio signal. Specifically, the present invention relates to a method and a device for processing an audio signal using metadata.

BACKGROUND ART 3D audio integrally denotes a series of signal processing, transmission, encoding, and reproduction technologies for providing a realistic sound in a three-dimensional space by providing another axis corresponding to a height direction to a sound scene on a horizontal plane (2D) provided by a typical surround audio. In particular, in order to provide the 3D audio, there is a demand for a rendering technique which allows a sound image to be formed at a virtual position in which a speaker is not present, even when a larger number of speakers are used or a smaller number of speakers compared to the prior art are used.

It is expected that the 3D audio will become an audio solution corresponding to an ultra-high definition television (UHDTV) and will be applied in various fields such as cinema sounds, personal 3DTVs, tablets, smart phones, wireless communication terminals, cloud games, as well as sounds in vehicles which are evolving into a high-quality infotainment space.

Meanwhile, there may be a channel-based signal and an object-based signal as forms of a sound source provided to the 3D audio. In addition, there may be a form of a sound source in which a channel-based signal and an object-based signal are mixed, and through this, a new type of content experience may be provided to a user.

Binaural rendering is modeling the 3D audio into a signal which is transferred to both ears of a person. The user may feel a stereoscopic effect through a two-channel audio output signal binaurally rendered through headphones or earphones. The theoretical base of binaural rendering is as follows. A person always hears a sound through both ears and recognizes the position and direction of a sound source through the sound. Therefore, if the 3D audio may be modeled into the form of an audio signal transferred to the both ears of the person, the stereoscopic effect of the 3D audio may be reproduced through a two-channel output audio signal without a large number of speaker.

DISCLOSURE

Technical Problem

An embodiment of the present invention is to provide a method and a device for processing an audio signal using metadata.

Specifically, the embodiment of the present invention is to provide a method and a device for processing an audio signal in which an object signal, a channel signal, or an ambisonics signal is rendered using metadata.

Technical Solution

An audio signal processing device rending an audio signal including a first element signal according to an embodiment of the present invention includes a processor for obtaining metadata including the audio signal and first element reference distance information and rendering the first element signal based on the first element reference distance information, wherein the first element reference distance information indicates the reference distance of the first element signal. The audio signal may include a second element signal which may be simultaneously rendered with the first element. The metadata may include second element distance information indicating the distance of the second element. The number of bits required for representing the first element reference distance information may be smaller than the number of bits required for representing the second element distance information. A set of reference distances which may be represented by the first element reference distance information may be a subset of a set of distances which may be represented by the second element distance information.

The first element reference distance information may indicate the reference distance of the first element signal using an exponential function.

The first element reference distance information may determine a value of an exponent of the exponential function.

The number of bits required to represent the first element reference distance information may be 7, and the number of bits required to represent the second element distance information may be 9.

The processor may obtain the reference distance of the first element signal from the first element reference distance information using the following equation.

Reference distance=0.01*2^(0.0472188798661443*(*bs*_Reference_Distance+119))

Reference distance may be the reference distance of the first element signal, the unit of the reference distance of the first element signal may be a meter (m),

- bs_Reference_Distance may be the first element reference distance information, and
- a value of the first element reference distance information may be an integer of 0 to 127.

A value which may be represented by the second element distance information may be an integer of 0 to 511. The processor may determine, when the value of the second element distance information is 0, that the distance of the second element signal is 0, and may obtain, when the value of the second element distance information is 1 to 511, the distance of the second element signal from the second element distance information using the following equation.

Distance=0.01*2^(0.0472188798661443*(Position Distance−1))

Distance may be the distance of the second element signal, a unit of the distance of the second element signal may be a meter (m), and Position_Distance may be the second element distance information.

The processor may assume, when the first element reference distance information is not defined, that the first element reference distance information indicates a first element default reference distance, and may assume, when the second element distance information is not defined, that the second element distance information indicates a second element default distance. The first element default reference distance and the second element default distance may have the same value.

The minimum reference distance which may be indicated by the first element reference distance information may be a predetermined positive number greater than 0.

The audio signal including the first element signal includes the second element signal, and the processor may render the first element signal and the second element signal, simultaneously. In this case, the processor may adjust, based on the first element reference distance information, the loudness of a sound output in which the first element signal is rendered, and may adjust, based on the second element distance information, the loudness of a sound output in which the second element signal is rendered. Also, the processor may apply a delay to the first element signal based on the first element reference distance information, and may apply a delay to the second element signal based on the second element distance information.

The first element signal may be a channel signal, and the first and the second element signal may be an object signal.

The first element signal may be an ambisonics signal, and the second element signal may be an object signal.

The first element signal may be a channel signal, and the audio signal may further include an ambisonics signal. The processor may render the ambisonics signal based on the reference distance of the first element signal.

The first element signal may be a channel signal, and the audio signal may further include an ambisonics signal. The first element reference distance information is channel reference distance information, and the metadata may include ambisonics reference distance information indicating the reference distance of the ambisonics signal. The processor may render the channel signal based on the channel reference distance information and may render the ambisonics signal based on the ambisonics reference distance information.

The processor may render the second element signal based on the first element reference distance information.

An audio signal processing device encoding an audio signal including a first element signal according to another embodiment of the present invention includes a processor for setting first element reference distance information indicating the reference distance of the first element signal and generating metadata including the first element reference distance information.

The audio signal may be capable of including a second element signal, and the metadata may be capable of including second element distance information indicating the distance of the second element signal.

The number of bits used for indicating the first element reference distance information may be smaller than the number of bits used for indicating the second element distance information. A set of reference distances which may be represented by the first element reference distance information may be a subset of a set of distances which may be represented by the second element distance information.

The first element reference distance information may indicate the reference distance of the first element signal using an exponential function.

The first element reference distance information may determine the value of an exponent of the exponential function.

The number of bits required to represent the first element reference distance information may be 7, and the number of bits required to represent the second element distance information may be 9.

The processor may set the value of the first element reference distance information such that the first element reference distance information indicates the reference distance of the first element signal according to the following equation.

$$\text{Reference distance}=0.01*2\hat{}(0.0472188798661443*(bs\_\text{Reference\_Distance}+119))$$

Reference distance may be the reference distance of the first element signal, the unit of the reference distance of the first element signal may be a meter (m), bs_Reference_Distance may be the first element reference distance information, and the value of the first element reference distance information may be an integer of 0 to 127.

A value which may be represented by the second element distance information may be an integer of 0 to 511. The processor may set, when the distance of the second element signal is 0, the value of the second element distance information to 0, and may set, when the distance of the second element signal is not 0, the value of the second element distance information such that the second element distance information indicates the distance of the second element signal according to the following equation.

$$\text{Distance}=0.01*2\hat{}(0.0472188798661443*(\text{Position\_Distance}-1))$$

Distance may be the reference distance of the second element signal, the unit of the distance of the second element signal may be a meter (m), Position_Distance may be the second element distance information, and the value of the second element distance information may be an integer of 1 to 511.

When the first element reference distance information is not defined, it is assumed that the first element reference distance information indicates a first element default reference distance, and when the second element distance information is not defined, it is assumed that the second element distance information indicates a second element default distance.

The minimum reference distance which may be indicated by the first element reference distance information may be a predetermined positive number greater than 0.

The first element signal may be a channel signal, and the second element signal may be an object signal.

The first element signal may be an ambisonics signal, and the second element signal may be an object signal.

Advantageous Effects

An embodiment of the present invention provides a method and a device for processing an audio signal using metadata.

Specifically, the embodiment of the present invention provides a method and a device for processing an audio signal in which an object signal, a channel signal, or an ambisonics signal is rendered using metadata.

DESCRIPTION OF DRAWINGS

FIG. 3 shows metadata used by a renderer according to an embodiment of the present invention;

FIG. 4 shows a syntax of a metadata configuration used by a renderer according another embodiment of the present invention;

FIG. 5 shows a syntax of an intracoded metadata frame (intracodedProdMetadataFrame) according to an embodiment of the present invention;

FIG. 6 shows a syntax of a dynamic metadata frame (dynamicProdMetadataFrame) and a syntax of a single dynamic metadata frame (singleDynamicProdMetadataFrame) according to an embodiment of the present invention;

FIG. 7 shows GOA metadata, which is metadata of an object signal, GCA metadata, which is metadata of a channel signal, and GHA metadata which is metadata of an ambisonics signal, which are used by an external renderer not defined according to the MPEG-H 3D Audio standard according to an embodiment of the present invention;

FIG. 8 shows a relationship among a value of channel reference distance information of metadata, a value of object distance information, and the reference distance of a channel signal according to an embodiment of the present invention;

FIG. 9 shows a syntax of a metadata configuration indicating a metadata-related setting according another embodiment of the present invention;

FIG. 10 shows a syntax of an intracoded metadata frame (intracodedProdMetadataFrame) according to another embodiment of the present invention;

FIG. 11 shows a syntax of a single dynamic metadata frame (singleDynamicProdMetadataFrame) according to an embodiment of the present invention;

FIG. 12 shows GOA metadata, which is metadata of an object signal, GCA metadata, which is metadata of a channel signal, and GHA metadata which is metadata of an ambisonics signal, which are used by an external renderer not defined according to the MPEG-H 3D Audio standard according to another embodiment of the present invention;

MODE FOR CARRYING OUT THE INVENTION

Figure 1:
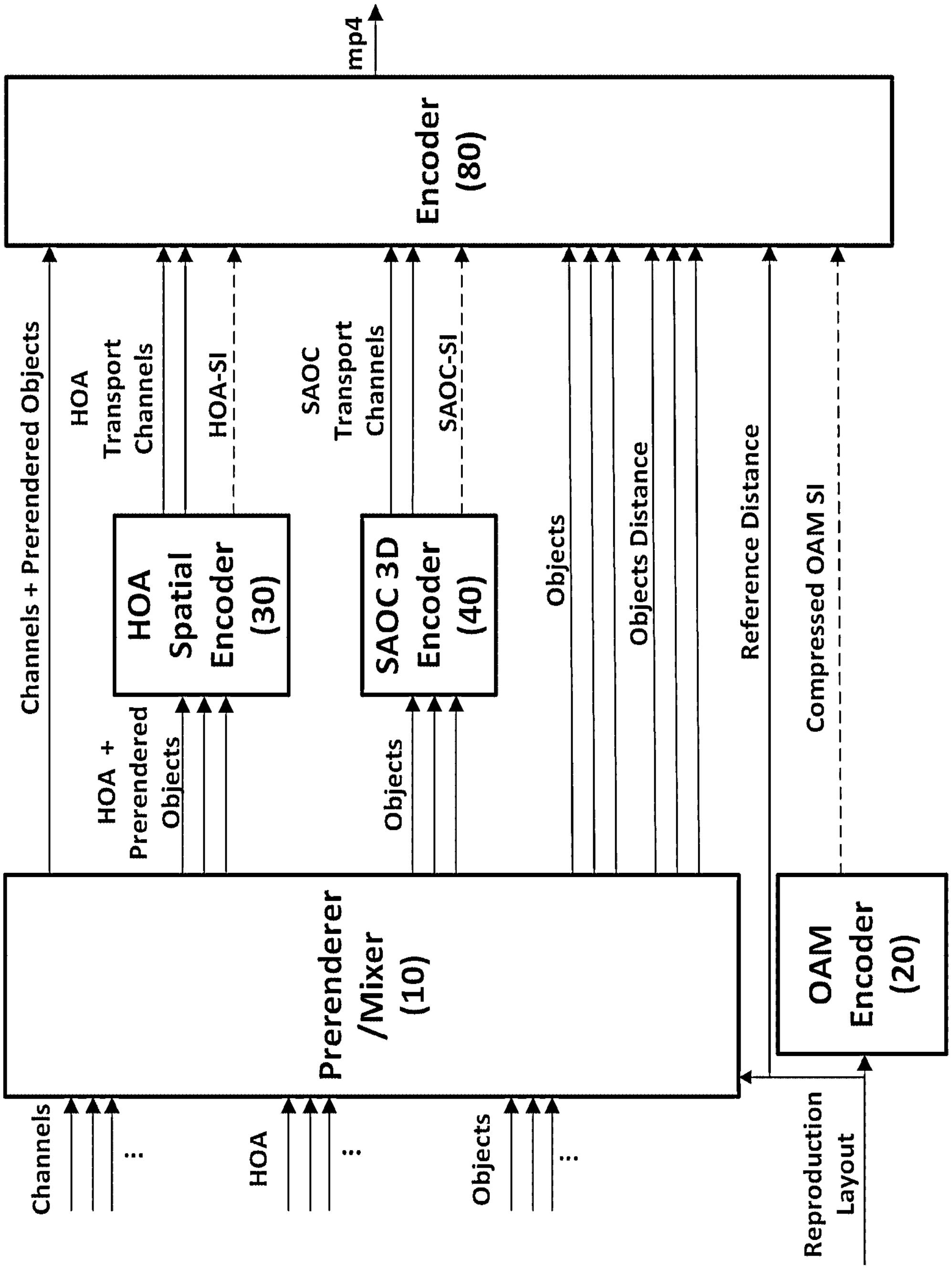
FIG. 1 is a block diagram showing an audio signal processing device encoding an audio signal according to an embodiment of the present invention.

Hereinafter, embodiments of the present invention will be described in detail with reference to the accompanying drawings so that those skilled in the art to which the present invention pertains may easily practice the embodiments. However, the present invention may be embodied in many different forms, and is not limited to the embodiments set forth herein. In addition, in order to clearly describe the present invention, parts irrelevant to the description are omitted in the drawings, and like reference numerals designate like elements throughout the specification.

In addition, when a portion is said to 'include' any component, it means that the portion may further include other components rather than excluding the other components unless otherwise stated.

FIG. 1 is a block diagram showing an audio signal processing device encoding an audio signal according to an embodiment of the present invention.

The audio signal processing device encoding an audio signal according to an embodiment of the present invention may encode at least one of channel, ambisonics (HOA) and object signals. A pre-renderer/mixer 10 receives and mixes at least one of a channel signal, an ambisonics signal, and an object signal. When pre-rendering is required, the pre-renderer/mixer 10 may pre-render at least one of a channel signal, an ambisonics signal, and an object signal.

An HOA spatial encoder 30 synthesizes an ambisonics signal and a pre-rendered object signal to convert the same into an ambisonics channel signal for the transmission of the pre-rendered object signal and metadata related to the ambisonics channel signal.

An SAOC 3D encoder 40 converts a discrete object signal into an SAOC channel type for transmission and metadata related to the SAOC channel.

If a reproduction system used when an audio signal is produced is configured as a speaker layout, or a reproduction system in which an audio signal is reproduced is a two-channel reproduction system which is reproduced by binaural rendering through a virtual speaker layout, the audio signal processing device may receive position information of the corresponding speaker layout as a reproduction layout. The distance from a listener of a sweet spot of the speaker layout to a speaker of the position information of the speaker layout may be encoded as the reference distance of the corresponding layout. An OAM encoder 20 may encode the reference distance in metadata of a bit stream. Also, the distance from an object to the listener of the sweet spot may be input as an object distance. SAOC 3D Encoder 40 may encode the object distance in metadata. In another embodiment, the object distance is individually transferred to an encoder 80, and the encoder 80 may encode the object distance in the metadata of the bit stream.

Figure 2:
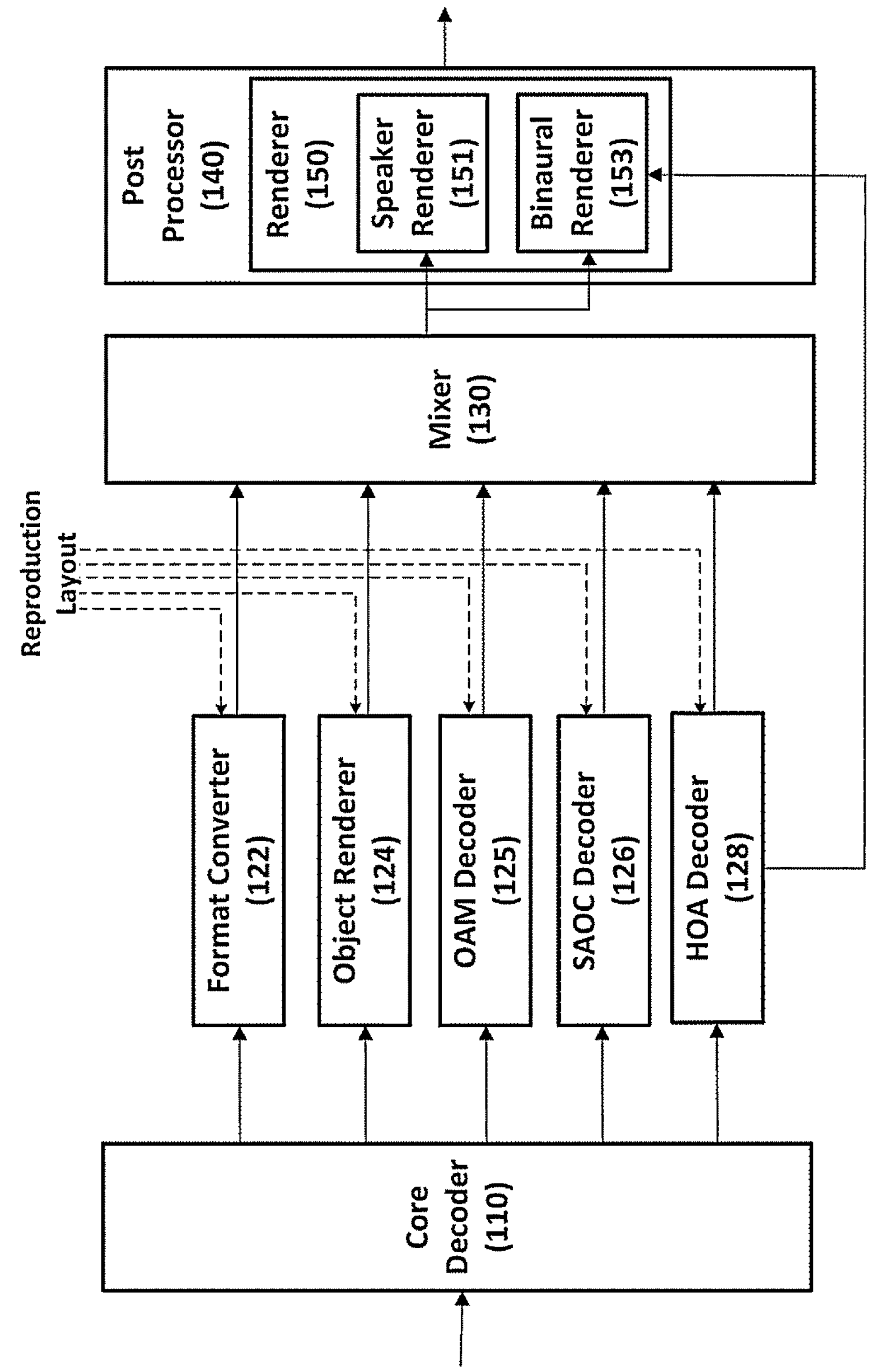
FIG. 2 is a block diagram showing an audio signal processing device decoding an audio signal accordance to an embodiment of the present invention.

FIG. 2 is a block diagram showing an audio signal processing device decoding an audio signal accordance to an embodiment of the present invention.

An audio signal decoder according to an embodiment of the present invention includes a core decoder 110, a mixer 130, and a post-processor 140. The core decoder 110 may decode at least one of a loudspeaker channel signal, a discrete object signal, an object downmix signal, and a pre-rendered signal. The core decoder 10 may use a codec based on the Unified Speech and Audio Coding (USAC). The core decoder 110 may decode a bit stream received by the core decoder 110 and transfer a decoded signal to at least one of a format converter 122, an object renderer 124, an OAM decoder 125, an SAOC decoder 126, and an HOA decoder 129 depending on the type of the decoded signal.

The format converter 122 converts a transferred channel signal into an output speaker channel signal. The format converter 122 may convert a configuration of a transferred channel into a configuration of a speaker channel to be reproduced. When the number of an output speaker channel (e.g., 5.1 channel) is smaller than the number of transferred channel (e.g., 22.2 channel) or the configuration of the transferred channel and the configuration of a channel to be reproduced are different, the format converter 122 may perform downmix for the transferred channel signal. A decoder generates an optimal downmix matrix using a combination of an input channel signal and the output speaker channel signal, and may perform downmix using the generated matrix. A channel signal processed by the format converter 122 may include a pre-rendered object signal. At least one object signal may be pre-rendered before the encoding of an audio signal to be mixed with the channel signal. The format converter 122 may convert the mixed object signal as described above into the output speaker channel signal with the channel signal.

The object renderer 123 and the SAOC decoder 126 may render an object signal. The object signal may include a discrete object waveform and a parametric object waveform. When the object signal includes an object waveform, an encoder may receive an object signal in the form of a monophonic waveform. In this case, the encoder may transmit the object signal using single channel elements (SCEs). When the object signal includes the parametric object waveform, a plurality of object signals may be downmixed to at least one channel signal. In this case, the characteristics of each object and the relationship between the objects may be expressed as a Spatial Audio Object Coding (SAOC) parameter. The object signal is downmixed and encoded by a core codec, and the encoder may transmit parametric information generated at the time of the encoding to the decoder.

When the object signal is transmitted to the decoder, compressed object metadata corresponding to the object signal may be transmitted together. Object metadata may quantize object properties by time and space to indicate the position and the gain value of each object in a three-dimensional space. The OAM decoder 125 receives the compressed object metadata and decodes the compressed object metadata to transfer the decoded compressed object metadata to at least one of the object renderer 124 and the SAOC decoder 126.

The object renderer 124 may render each object signal according to a given reproduction format using the object metadata. In this case, the object renderer 124 may render an object signal to a specific output channel based on the object metadata. The SAOC decoder 126 may restore at least one of the object signal and the channel signal from a decoded SAOC transmission channel and the parametric information. The SAOC decoder 126 may generate the output audio signal based on reproduction layout information and the object metadata. As described above, the object renderer 123 and the SAOC decoder 126 may render the object signal to the channel signal.

The HOA decoder 128 receives a higher order ambisonics (HOA) signal and HOA additional information, and may decode the HOA signal and the HOA additional information. The HOA decoder 128 models the channel signal or the object signal by a separate equation and generates a sound scene. When a position of a speaker in a space in the generated sound scene is selected, rendering may be performed to a speaker channel signal.

Although not illustrated in FIG. 2, dynamic range control (DRC) may be performed on a signal output from the core decoder 110 as a pre-processing process. The DRC limits the dynamic range of an audio signal reproduced to a predetermined level. In a signal applied by the DRC, a sound less loud than a preset range is adjusted to be louder and a sound louder than the preset range is adjusted to be less loud.

An audio signal output from the format converter 122, the object renderer 124, the OAM decoder 125, the SAOC decoder 126, and the HOA decoder 128 is transferred to the mixer 130. The mixer 130 adjusts a delay of a channel-based waveform and a delay of a rendered object waveform, and sums the channel-based waveform and the rendered object waveform in a sample unit. An audio signal summed by the mixer 130 is transferred to a post-processing unit 140.

The post-processing unit 140 includes a renderer 150. The renderer 150 may include at least one of a speaker renderer 151 and a binaural renderer 153. The speaker renderer 151 performs post-processing for outputting at least one of a multi-channel and a multi-object audio signal transferred from the mixer 130. The above post-processing may include at least one of the dynamic range control DRC, loudness normalization LN, and a peak limiter PL.

The binaural renderer 152 generates a binaural downmix signal of at least one of the multi-channel and the multi-object audio signal. The binaural downmix signal is a two-channel audio signal to allow each input channel signal and an object signal to be expressed on a three-dimensional phase. The binaural renderer 153 may receive an audio signal supplied to the speaker renderer 153 as an input signal. The binaural rendering is performed based on a binaural room impulse response (BRIR) filter, and may be performed on a time domain or a QMF domain. The post-processor 140 may additionally perform at least one of the dynamic range control DRC, the loudness normalization LN, and the peak limiter PL described above as post-processing of the binaural rendering.

When contents including a channel signal, an object signal, and an ambisonics signal are rendered, a renderer needs to render while maintaining a relative balance of loudness and distance between each element. Particularly, element metadata may include information indicating the reference distance of the reproduction layout. The reference distance of each element signal of an audio signal represents the distance between the circumference of a virtual speaker layout required to render the each element signal when a listener is position in a sweet spot in a virtual space expressed by the audio signal and the listener, that is, a radius. The distance of the object signal, that is, the object distance, may represent the distance from the center of a listener's head when the listener is positioned at a sweet spot in a virtual space expressed by an audio signal including the object signal to an object simulated and reproduced. In addition, the reference distance of a channel signal may be represented as the distance from the center of the listener's head to a speaker layout used when an audio signal including the channel signal is produced. In addition, the reference distance of an ambisonics signal may be represented as the distance from the center of a listener's head when the listener is positioned at a sweet spot in a virtual space expressed by an audio signal including the ambisonics signal to a real or virtual speaker layout decoded to reproduce the ambisonics signal. For convenience of description, information indicating the distance of the object signal, that is, the object distance, is referred to as object distance information. Even when a renderer uses the object distance information, if a method for determining a reference distance used when rendering a channel signal or an ambisonics signal is not defined, the following problems may occur. For example, in binaural rendering an object, when an object signal is rendered to a virtual speaker channel signal, and then the channel signal is rendered again to a binaural signal to reproduce a final binaural signal, depending on the change of a virtual speaker layout used in a final reproduction system, the volume balance between the object signal and a non-diegetic channel signal may not be maintained as intended by a creator. In this case, the non-diegetic audio signal may be a signal constituting an audio scene fixed based on a listener. In a virtual space, regardless of the movement of the listener, the directionality of a sound output in response to the non-diegetic audio signal may not change. In addition, the relative distance between a sound image simulated by the channel signal or the ambisonics signal perceived by the listener and the object may be different from that intended by the creator. In addition, when the renderer performs distance-dependent ambisonics rendering, the renderer may undercompensate or overcompensate the ambisonics signal compared to a distance intended by the creator.

Therefore, information on the reference distance of each of the channel signal and the ambisonics signal needs to be provided. In addition, the renderer needs to render the channel signal on the basis on the information of the reference distance of the channel signal. In addition, the renderer needs to render the ambisonics signal based on the information on the reference distance of the ambisonics signal. Specifically, based on the information on the reference distance of the element signal, the render needs to adjust the loudness of a sound output in which an element signal is rendered. In addition, when the renderer renders the element signal, the renderer needs to apply a delay based on the information on the reference distance of the element signal. For convenience of description, the information on the reference distance of the channel signal is referred to as channel reference distance information. For convenience of description, the information on the reference distance of the ambisonics signal is referred to as ambisonics reference distance information. A method for setting and using the channel reference distance information and the ambisonics reference distance information will be described with reference to FIG. 3 to FIG. 14. Also, in the present disclosure, an embodiment of the present invention will be described by taking the MPEG-H 3D Audio standard of ISO/IEC as an example. However, the embodiment of the present invention is not limited to the MPEG-H 3D Audio standard of ISO/IEC.

First, an embodiment of a syntax of metadata including information on a reference distance will be described.

FIG. 3 shows metadata used by a renderer according to an embodiment of the present invention. Specifically, FIG. 3(*a*) shows a syntax of a metadata configuration indicating a metadata-related setting according an embodiment of the present invention. FIG. 3(*b*) shows a syntax of a metadata frame indicating metadata by frame according to a metadata-related setting according to an embodiment of the present invention. FIG. 3(*c*) shows GOA metadata defined as an interface for transferring metadata of an object signal to an external renderer which is not defined according to the MPEG-H 3D Audio standard according to an embodiment of the present invention.

The renderer may apply a default value of the reference distance of the channel signal to a channel signal whose channel reference distance information is not defined. For convenience of description, the default value of the reference distance of the channel signal is referred to as a channel default reference distance. When a bit stream has not defined the reference distance of the channel signal, the renderer may assume the channel default reference distance as the reference distance of the channel signal. The metadata configuration may include a reference distance flag (has_reference_distance) representing whether the channel reference distance information (reference_distance) indicates a value other than the channel default reference distance in the metadata frame. When the reference distance flag is not activated, a value of channel reference distance information (bs_reference_distance) may be set to a predetermined value. This will be described again later.

The renderer may apply a default distance value to an object signal whose object distance information is not defined, for example, an object signal having only an azimuth and an elevation. For convenience of description, the default distance value of the audio signal is referred to as an object default distance. When a bit stream in which an object signal in encoded has not defined the distance of the object signal, the renderer may assume the object default distance as the distance of the object signal. The metadata configuration may include an object distance flag (has_object_distance) representing whether the object distance information (reference_distance) indicates a value other than the object default distance in the metadata frame. The object distance flag may indicate whether the object distance information indicates a value other than the object default distance by object signal group. In addition, when binaural rendering is performed, the metadata configuration may include a flag (directHeadphone) indicating whether the corresponding channel signal group is directly output to a headphone.

The metadata frame may include the channel reference distance information (reference_distance). Specifically, when the reference distance flag (has_reference_distance) is activated, the channel reference distance information (reference_distance) of the metadata frame may indicate a value other than the channel default reference distance. The channel reference distance information (reference_distance) may be indicated by 6 bits. In addition, when the object distance flag (has_object_distance) is activated, the metadata frame may include an intracoded flag (has_intracoded_data) representing whether a current frame includes intracoded (intracoded) data. Whether a frame corresponding to the metadata frame is intracoded, the metadata frame may include the intracoded metadata frame (intracodedProdMetadataFrame) or the dynamic metadata frame (dynamicProdMetadataFrame).

The GOA metadata may include a GOA reference distance flag (goa_hasReferenceDistance) representing whether the channel reference distance information of the GOA metadata (goa_bsReferenceDistance) indicates a value other than the channel default reference distance. When the GOA reference distance flag is activated, the channel reference distance information indicates a value other than the channel default reference distance. The channel reference distance information may be indicated by 6 bits. The GOA metadata may include an object distance flag (goa_hasObjectDistance) representing whether the object distance information of the GOA metadata (goa_bsObjectDistance) indicates a value other than the object default distance. In this case, the GOA metadata may represent whether the object distance information of the GOA metadata (goa_bsObjectDistance) indicates a value other than the default value of the object default distance by object signal group. When the GOA object distance flag (goa_hasObjectDistance) is activated, the object distance information of the GOA metadata (goa_bsObjectDistance) may indicate a value other than the object default distance. In this case, the object distance information (reference_distance) may be indicated by 8 bits.

As in the above-described syntax, the number of bits which may be allocated to indicate information on a reference distance in metadata may be limited. Since a limited number of bits is used, when the difference between the quantization levels of the information on the reference distance is too large, the renderer may not reflect the effect of change in distance on rendering. In addition, when the difference between the quantization levels of the information on the reference distance is too small, the transmission and storage burden of a field indicating the information on the reference distance may be increased. Therefore, there is a need for an appropriate quantization method for representing information on a reference distance.

Metadata may indicate a channel reference distance using an exponential function. Specifically, the channel reference distance information may determine the value of an exponent of the corresponding exponential function. In such an embodiment, as the value of the channel reference distance information increases, a distance represented by the channel reference distance information is also increased according to the exponential function. Therefore, a renderer may evenly render the size of a sound attenuated according to the distance.

As in the metadata described above, the number of bits of a field indicating the channel reference distance information may be smaller than the number of bits of a field indicating object distance information. This is because there may be a need for the distance representation of an object signal simulating the position of an object which change in real time to be more precise than that of a channel signal simulating the position of a speaker. A set of reference distance values which may be represented by the channel reference distance information may be a subset of a set of object distance values which may be represented by the object distance information. Through the above, when a channel signal and an object signal may be rendered together, the renderer may efficiently render at least one of the channel signal and the object signal.

The minimum distance which may be indicated by the channel reference distance information may be a predetermined positive number greater than 0. In this case, the minimum distance may be 450 mm. This is because when the reference distance is equal to or less than a predetermined size, the effect of change in the reference distance on rendering may be insignificant. Through such an embodiment, the number of bits required to represent the channel reference information may be reduced.

In addition, the renderer may apply a channel default reference distance to a channel signal whose channel reference distance information is not defined. When a bit stream in which the channel signal is encoded has not defined the reference distance of the channel signal, the renderer may assume the channel default reference distance as the reference distance of the channel signal. In this case, the channel default reference distance may be a predetermined value. The predetermined value may be 1008 mm.

In a specific embodiment, the channel reference distance information may indicate the reference distance of a channel signal according to the following equation.

Reference distance=distanceOffset+[10^(0.03225380*(referece_distance+82))−1]

In this case, Reference distance is the reference distance of the channel signal, and the unit of the reference distance is a millimeter (mm). Also, distanceOffset represents an offset value of the reference distance of the channel signal. Specifically, the value of distanceOffset may be 10 mm. Also, reference_distance represents a value of the channel reference distance information. The channel reference distance information may indicate a distance corresponding to a minimum of 450 mm to a maximum of 47521 mm.

Specifically, channel reference information of the metadata frame (bs_reference_distance) described above may indicate the reference distance of a channel signal according to the following table.

| reference_distance | reference distance |
|---|---|
| 0-63 | (reference distance) = distanceOffset + [10^(0.03225380 * (reference_distance + 82)) − 1]; The distanceOffset is 10 mm. |

Also, the channel reference information of the GOA metadata (goa_bsReferenceDistance) described above may indicate the reference distance of a channel signal according to the following table.

| goa_bsReferenceDistance | reference distance |
|---|---|
| 0-63 | (reference distance) = distanceOffset + [10^(0.03225380 * (goa_bsReferenceDistance + 82)) − 1]; The distanceOffset is 10 mm. |

FIG. 4 shows a syntax of a metadata configuration used by a renderer according another embodiment of the present invention. Also, FIG. 5 show a syntax of an intracoded metadata frame (intracodedProdMetadataFrame) according to an embodiment of the present invention. FIG. 6 shows a syntax of a dynamic metadata frame (dynamicProdMetadataFrame) and a syntax of a single dynamic metadata frame (singleDynamicProdMetadataFrame) according to an embodiment of the present invention;

The channel default reference distance may be set to be the same as a default value of the reference distance of an element signal which may be reproduced together with a channel signal. Specifically, the channel default reference distance may be set to the same value as an object default distance. Specifically, the channel default reference distance may be set to the same as a default value of an ambisonics signal. In addition, when the value of the channel reference distance information is a specific value, the channel reference distance information may indicate a default value of the reference distance of the channel signal. When the channel reference distance information indicates the channel default reference distance, the channel reference distance information may indicate a predetermined value without using an exponential function used to indicate the channel reference distance. Specifically, when the value of the channel reference distance information is from 0 to 62, the channel reference distance information may indicate the reference distance of a channel signal using the following equation.

Reference distance=distanceOffset+[10^(0.03225380*(*bs*_reference_distance+83))−1]

In this case, Reference distance is the reference distance of the channel signal, and the unit of the reference distance is a millimeter (mm). Also, distanceOffset represents an offset value of the reference distance of the channel signal. Specifically, the value of distanceOffset may be 10 mm. Also, bs_reference_distance represents a value of the channel reference distance information. The channel reference distance information may indicate a distance corresponding to a minimum of 484 mm to a maximum of 51184 mm.

In addition, when the value of the channel reference distance information is 63, the channel reference distance information may indicate that the reference distance of the channel signal is a channel default reference value. The channel default reference value may be indicated to be 2^(5/3) m (that is, 3174 mm).

The channel reference information of the metadata frame (bs_reference_distance) may indicate the reference distance of a channel signal according to the following table.

| bs__reference__distance | reference distance |
|---|---|
| 0-62 | (reference distance) = distanceOffset + [10^(0.03225380 * (bs__reference__distance + 83)) − 1]; The distanceOffset is 10 mm. |
| 63 | (reference distance) = 2^(5/3) |

When the reference distance flag (has_reference_distance) is not activated in the embodiment of FIG. 4, the value of the reference distance information (bs_reference-distance) may be set to a predetermined value indicating the default reference distance. In this case, the predetermined value may be 63. The rest of the syntax of the metadata configuration of FIG. 4 may be the same as described with reference to FIG. 3.

As described above, when a frame corresponding to the metadata frame is intracoded, the metadata frame may include the intracoded metadata frame (intracodedProdMetadataFrame). FIG. 5 show a syntax of the intracoded metadata frame (intracodedProdMetadataFrame) according to a specific embodiment.

The intracoded metadata frame (intracodedProdMetadataFrame) may include a fixed distance flag (fixed_distance) indicating whether distances of all object signals are fixed values. In addition, the intracoded metadata frame (intracodedProdMetadataFrame) may include a common distance (common_distance) flag indicating whether an object distance common to all objects is used. When the fixed distance flag or the common distance flag is activated, the renderer may render all object signals using a default value of the distance of an object signal. When the fixed distance flag or the common distance flag is not activated, the renderer may render each object signal based on the distance of each object signal (position_distance).

In addition, the dynamic metadata frame (dynamicProdMetadataFrame) may indicate the reference distance of an object signal through the single dynamic metadata frame (singleDynamicProdMetadataFrame). FIG. 6(*a*) shows a syntax of the dynamic metadata frame (dynamicProdMetadataFrame) according to a specific embodiment. FIG. 6(*b*) show a syntax of the single dynamic metadata frame (singleDynamicProdMetadataFrame) according to a specific embodiment.

In the single dynamic metadata frame, the distance of an object signal (position_distance) may be transmitted as an absolute value or may be transmitted differentially. The single dynamic metadata frame may include an absolute distance flag (flag_dist_absolute) indicating whether the object distance is transmitted as an absolute value or differentially. When the absolute distance flag (flag_dist_absolute) is activated, the single dynamic metadata frame indicates the distance of an object signal as the absolute value. Specifically, the object distance information (position_distance) included in the single dynamic metadata frame may indicate the distance of an object signal. The distance of an object signal may be the distance from the center of a listener's head who is in a sweet spot to an object. In this case, the object distance information (position_distance) included in the single dynamic metadata frame may indicate the distance of an object signal according to the following table.

| position__distance | distance |
|---|---|
| 0 | distance = 0 |
| 1-253 | distance = distanceOffset + [10^(0.03225380 * (position__distance + 1)) − 1]; The distanceOffset is 10 mm. |
| 254 | distance = 167 km |
| 255 | distance = 2^(5/3) |

Also, when the absolute distance flag (flag_dist_absolute) is not activated, the single dynamic metadata frame may indicate the difference between a distance value of a previous object of an object signal and a distance value of a current object. Specifically, the object distance information (position_distance) included in the single dynamic metadata frame may indicate the difference between a distance value of a previous object of an object signal and a distance value of a current object. The single dynamic metadata frame may include a distance flag (distance_flag) indicating whether the distance of an object signal is changed during an intra-frame period (intra-frame period). When the distance flag (distance_flag) is activated, the single dynamic metadata frame may indicate a distance difference (position_distance_difference) between a linearly interpolated value and an actual object distance value of an object signal. In addition, when the distance flag (distance_flag) is activated, the single dynamic metadata frame may also indicate the number of bits (nBitsDistance) required to indicate an object distance difference. The above-described embodiments for the channel reference distance information may be equally applied to the ambisonics reference distance information. This will be described in detail with reference to FIG. 7.

FIG. 7 shows GOA metadata, which is metadata of an object signal, GCA metadata, which is metadata of a channel signal, and GHA metadata which is metadata of an ambisonics signal, which are used by an external renderer not defined according to the MPEG-H 3D Audio standard according to an embodiment of the present invention;

Metadata may indicate an ambisonics reference distance using an exponential function. Specifically, the ambisonics reference distance information may determine the value of an exponent of the corresponding exponential function. In such an embodiment, as the value of the ambisonics reference distance information increases, a distance represented by the ambisonics reference distance information is also increased according to the exponential function. Therefore, a renderer may evenly render the size of a sound attenuated according to the distance.

As in the metadata described above, the number of bits of a field indicating the ambisonics reference distance information may be smaller than the number of bits of a field indicating object distance information. A set of reference distance values which may be represented by the ambisonics reference distance information may be a subset of a set of object distance values which may be represented by the object distance information. Through the above, when an ambisonics signal and an object signal may be rendered together, the renderer may efficiently render at least one of the ambisonics signal and the object signal.

The minimum distance which may be indicated by the ambisonics reference distance information may be a predetermined positive number greater than 0. In this case, the minimum distance may be 484 mm. This is because when the reference distance is equal to or less than a predetermined size, the effect of change in the reference distance on rendering may be insignificant.

The renderer may apply a default value of the reference distance of the ambisonics signal to an ambisonics signal whose ambisonics reference distance information is not defined. For convenience of description, the default value of the reference distance of the ambisonics signal is referred to as an ambisonics default reference distance. When a bit stream in which the ambisonics signal is encoded has not defined the reference distance of the ambisonics signal, the renderer may assume the ambisonics default reference distance as the reference distance of the ambisonics signal. The ambisonics default reference distance may be set to be the same as a default value of the reference distance of an element signal which may be reproduced together with an ambisonics signal. Specifically, the ambisonics default reference distance may be set to the same as a default value of an object signal or a channel signal. In addition, when the value of the ambisonics reference distance information is a specific value, the ambisonics reference distance information may indicate an ambisonics default reference distance. When the ambisonics reference distance information indicates the ambisonics default reference distance, the ambisonics reference distance information may indicate a predetermined value without using an exponential function used to indicate the reference distance. Specifically, when the value of the ambisonics reference distance information is from 0 to 62, the ambisonics reference distance information may indicate the reference distance of an ambisonics signal using the following equation.

Reference distance=distanceOffset+[10^(0.03225380*(*bs*_reference_distance+83))−1]

In this case, Reference distance is the reference distance of the ambisonics signal, and the unit of the reference distance is a millimeter (mm). Also, distanceOffset represents an offset value of the reference distance of the ambisonics signal. Specifically, the value of distanceOffset may be 10 mm. Also, reference_distance represents a value of the ambisonics reference distance information. The ambisonics reference distance information may indicate a distance corresponding to a minimum of 484 mm to a maximum of 51184 mm.

In addition, when the value of the ambisonics reference distance information is 63, the ambisonics reference distance information may indicate the ambisonics default reference distance. The ambisonics default reference distance may be 2^(5/3) m (that is, 3174.8 mm). When a bit stream has not defined the reference distance of the ambisonics signal, the renderer may assume the ambisonics default reference distance as the reference distance of the ambisonics signal.

FIG. 7(*a*) shows the GOA metadata. The GOA metadata may include the object distance flag (goa_hasObjectDistance) representing whether the object distance information of the GOA metadata (goa_bsObjectDistance) indicates a value other than the object default distance. In this case, the GOA metadata may represent whether the object distance information of the GOA metadata indicates a value other than the object default distance by object signal group. When the GOA object distance flag (goa_hasObjectDistance) is activated, the object distance information of the GOA metadata (goa_bsObjectDistance) indicates a value other than the object default distance. In this case, the object distance information (goa_bsObjectDistance) may be indicated by 8 bits. The object distance information (goa_bsObjectDistance) included in the GOA metadata may indicate the distance of an object signal according to the following table. In this case, the object distance information (goa_bsObjectDistance) may indicate a distance corresponding to a minimum of 0 to a maximum of 167 km.

| goa_bsObjectDistance | distance |
|---|---|
| 0 | distance = 0 |
| 1-253 | distance = distanceOffset + [10^(0.03225380 * (goa_bsObjectDistance + 1)) − 1];<br>The distanceOffset is 10 mm. |
| 254 | distance = 167 km |
| 255 | distance = 2^(5/3) |

FIG. 7(*b*) shows the GCA metadata. The GCA metadata may include a GCA channel distance flag (gca_hasReferenceDistance) representing whether channel reference distance information of the GCA metadata (gca_bsReferenceDistance) indicates a value other than a default distance. In this case, the GCA metadata may represent whether the channel reference distance information of the GCA metadata (gca_bsReferenceDistance) indicates a value other than the channel default reference distance by channel signal group. When the GCA channel distance flag (gca_hasReferenceDistance) is activated, the channel reference distance information of the GCA metadata (gca_bsReferenceDistance) indicates a value other than the channel default reference distance. The channel reference distance information (gca_bsReferenceDistance) may be indicated by 6 bits. In addition, when binaural rendering is performed, the GCA metadata may include a flag (gca_directHeadphone) indicating whether the corresponding channel signal group is directly output to a headphone. The channel reference distance information (gca_bsReferenceDistance) included in the GCA metadata may indicate the reference distance of a channel signal according to the following table.

| gca_bsReferenceDistance | reference distance |
|---|---|
| 0-62 | (reference distance) = distanceOffset + [10^(0.03225380 * (gca_bsReferenceDistance + 83)) − 1];<br>The distanceOffset is 10 mm. |
| 63 | (reference distance) = 2^(5/3) |

FIG. 7(*c*) shows the GHA metadata. The GHA metadata may include a GHA ambisonics distance flag (gha_hasReferenceDistance) representing whether ambisonics reference distance information of the GHA metadata (gha_bsReferenceDistance) indicates a value other than the ambisonics default reference distance. In this case, the GHA metadata may represent whether the ambisonics reference distance information of the GHA metadata (gha_bsReferenceDistance) indicates a value other than the ambisonics default reference distance by ambisonics signal group. When the GHA ambisonics distance flag (gha_hasReferenceDistance) is activated, the ambisonics reference distance information of the GHA metadata (gha_bsReferenceDistance) indicates a value other than the ambisonics default reference distance. The ambisonics reference distance information may be indicated by 6 bits. The ambisonics reference distance information (gha_bsReferenceDistance) included in the GHA metadata may indicate the reference distance of an ambisonics signal according to the following table.

| gha_bsReferenceDistance | reference distance |
|---|---|
| 0-62 | (reference distance) = distanceOffset + [10^(0.03225380 * (gha_bsReferenceDistance + 83)) − 1]; The distanceOffset is 10 mm. |
| 63 | (reference distance) = 2^(5/3) |

As described above, the channel default reference distance may be set to be the same as a default value of the reference distance of an element signal which may be reproduced together with a channel signal. In addition, when the value of the channel reference distance information is a specific value, the channel reference distance information may indicate a default value of the reference distance of the channel signal. To this end, the channel reference distance information may indicate the reference distance of the channel signal using an exponential function corresponding to a channel default reference distance at a specific value. In the following embodiments to be described, if there is no description contrary to the descriptions of the above-described embodiments, the following embodiments to be described and the above-described embodiments may be applied together.

Specifically, the channel reference distance information may indicate the reference distance of a channel signal according to the following equation.

$$\text{Reference distance}=\text{distanceOffset}+2\hat{}[(bs\_\text{reference\_distance}+99)/11]$$

In this case, Reference distance is the reference distance of the channel signal, and the unit of the reference distance is a millimeter (mm). Also, distanceOffset represents an offset value of the reference distance of the channel signal. Specifically, the value of distanceOffset may be 2^(5/3)*1000−2^(128/11)≈−8.6220 mm. Also, bs_reference_distance represents a value of the channel reference distance information. The channel reference distance information may indicate a distance corresponding to a minimum of 503 mm to a maximum of 27115 mm. In addition, when the value of the channel reference distance information is 29, the channel reference distance information indicates the channel default reference distance.

The channel reference information of the metadata frame (bs_reference_distance) may indicate the reference distance of a channel signal according to the following table.

| bs_reference_distance | reference distance |
|---|---|
| 0-63 | reference distance = offset + [2^((bs_reference_distance + 99)/11)]; The offset is 2^(5/3)*1000 − 2^(128/11) ≈ −8.6220 mm |

In addition, as the reference distance of a channel signal indicated by the channel reference distance information is changed, a method in which the object distance information indicates the distance of an object signal may be changed. The object distance information (position_distance) included in the single dynamic metadata frame may indicate the distance of an object signal according to the following table. In this case, the object distance information (position_distance) may indicate a distance corresponding to a minimum of 0 to a maximum of 167 km.

| position_distance | distance |
|---|---|
| 0 | distance = 0 |
| 1-254 | distance = offset + [2^((position_distance + 45)/11)]; The offset is 2^(5/3)*1000 − 2^(128/11) ≈ −8.6220 mm |
| 255 | distance = 167 km |

The object distance information (goa_bsObjectDistance) included in the GOA metadata may indicate the distance of an object signal according to the following table. The object distance information (goa_bsObjectDistance) may indicate a distance corresponding to a minimum of 0 to a maximum of 167 km.

| goa_bsObjectDistance | distance |
|---|---|
| 0 | distance = 0 |
| 1-254 | distance = offset + [2^((goa_bsObjectDistance + 45)/11)]; The offset is 2^(5/3)*1000 − 2^(128/11) ≈ −8.6220 mm |
| 255 | distance = 167 km |

The channel reference distance information (gca_bsReferenceDistance) included in the GCA metadata may indicate the reference distance of a channel signal according to the following table. The channel reference distance information (gca_bsReferenceDistance) may indicate a distance corresponding to a minimum of 503 mm to a maximum of 27115 mm. In addition, when the value of the channel reference distance information (gca_bsReferenceDistance) is 29, the channel reference distance information indicates the channel default reference distance.

| gca_bsReferenceDistance | reference distance |
|---|---|
| 0-63 | reference distance = offset + [2^((gca_bsReferenceDistance + 99)/11)]; The offset is 2^(5/3)*1000 − 2^(128/11) ≈ −8.6220 mm |

In addition, as the reference distance of a channel signal indicated by the channel reference distance information is changed, a method in which the ambisonics reference distance information indicates the reference distance of an ambisonics signal may be changed. The ambisonics reference distance information (gha_bsReferenceDistance) included in the GHA metadata may indicate the reference distance of an ambisonics signal according to the following table. The ambisonics reference distance information (gha_bsReferenceDistance) may indicate a distance corresponding to a minimum of 503 mm to a maximum of 27115 mm. In addition, when the value of the ambisonics reference distance information (gha_bsReferenceDistance) is 29, the ambisonics reference distance information indicates the ambisonics default reference distance.

| gha_bsReferenceDistance | reference distance |
|---|---|
| 0-63 | reference distance = offset + [2^((gha_bsReferenceDistance + 99)/11)]; The offset is 2^(5/3)*1000 − 2^(128/11) ≈ −8.6220 mm |

In another specific embodiment, metadata may indicate the reference distance of a channel signal at a linearized interval, the channel signal having the reference distance equal to or smaller than a predetermined distance. In this case, the metadata may indicate the reference distance of a channel signal, the channel signal having the reference distance greater than a predetermined distance using an exponential function. The predetermined distance may be 3.1 m. In such an embodiment, when the reference distance of a channel signal is relatively small, the channel reference distance information may indicate the reference distance of a channel signal using a fine quantization interval. When the reference distance of a channel signal is relatively large, the channel reference distance information may indicate the reference distance of a channel signal using a quantization interval which is not fine. In the following embodiments to be described, if there is no description contrary to the descriptions of the above-described embodiments, the following embodiments to be described and the above-described embodiments may be applied.

Specifically, when the value of the channel reference distance information is from 1 to 38, the channel reference distance information may indicate the reference distance of a channel signal according the following equation.

$$\text{Reference\_distance}=(4*bs\_\text{reference\_distance}+4)/160*\text{default\_reference\_distance}$$

Specifically, when the value of the channel reference distance information is from 39 to 63, the channel reference distance information may indicate the reference distance of a channel signal according the following equation.

$$\text{Reference\_distance}=10\hat{}(1/20*(bs\_\text{reference\_distance}-39))*\text{default\_reference\_distance}$$

In this case, Reference distance is the reference distance of the channel signal, and the unit of the reference distance is a meter (m). In addition, default_reference_distance represents the channel default reference distance. The value of the default_reference_distance may be 2^(5/3) (that is, 3.1748 m). Also, bs_reference_distance represents a value of the channel reference distance information. The channel reference distance information may indicate a distance corresponding to a minimum of 0.0794 m to a maximum of 50.317 m. In addition, when the value of the channel reference distance information is 39, the channel reference distance information indicates the channel default reference distance.

The channel reference information of the metadata frame (bs_reference_distance) may indicate the reference distance of a channel signal according to the following table.

| bs_reference_distance | reference distance |
|---|---|
| 0-38 | (reference_distance) = (4 * bs_reference_distance + 4)/160 * default_reference_distance |
| 39-63 | (reference_distance) = 10^(1/20 * (bs_reference_distance − 39)) * default_reference_distance |

default_reference_distance = 2^(5/3) m ≈ 3.1748 m

In addition, as the reference distance of a channel signal indicated by the channel reference distance information is changed, a method in which the object distance information indicates the distance of an object signal may be changed. The object distance information (position_distance) included in the single dynamic metadata frame may indicate the distance of an object signal according to the following table. In this case, the object distance information (position_distance) may indicate a distance corresponding to a minimum of 0 to a maximum of 167 km.

| position_distance | distance |
|---|---|
| 0-159 | distance = position_distance/160 * default_reference_distance |
| 160-254 | distance = 10^(1/20 * (position_distance − 160)) * default_reference_distance |
| 255 | distance = 167 km |

default_reference_distance = 2^(5/3) m ≈ 3.175 m

The object distance information (goa_bsObjectDistance) included in the GOA metadata may indicate the distance of an object signal according to the following table. The object distance information (goa_bsObjectDistance) may indicate a distance corresponding to a minimum of 0 to a maximum of 167 km.

| goa_bsObjectDistance | distance |
|---|---|
| 0-159 | distance = position_distance/160 * default_reference_distance |
| 160-254 | distance = 10^(1/20 * (goa_bsObjectDistance − 160)) * default_reference_distance |
| 255 | distance = 167 km |

default_reference_distance = 2^(5/3) m ≈ 3.175 m

The channel reference distance information (gca_bsReferenceDistance) included in the GCA metadata may indicate the reference distance of a channel signal according to the following table. The channel reference distance information (gca_bsReferenceDistance) may indicate a distance corresponding to a minimum of 0.0794 m to a maximum of 50.317 m. In addition, when the value of the channel reference distance information (gca_bsReferenceDistance) is 39, the channel reference distance information indicates the channel default reference distance.

| gca_bsReferenceDistance | reference distance |
|---|---|
| 0-38 | (reference_distance) = (4 * gca_bsReferenceDistance + 4)/160 * default_reference_distance |
| 39-63 | (reference_distance) = 10^(1/20 * (gca_bsReferenceDistance − 39)) * default_reference_distance |

default_reference_distance = 2^(5/3) m ≈ 3.1748 m

In addition, as the reference distance of a channel signal indicated by the channel reference distance information is changed, a method in which the ambisonics reference distance information indicates the reference distance of an ambisonics signal may be changed. The ambisonics reference distance information (gha_bsReferenceDistance) included in the GHA metadata may indicate the reference distance of an ambisonics signal according to the following table. The ambisonics reference distance information (gha_bsReferenceDistance) may indicate a distance corresponding to a minimum of 0.0794 m to a maximum of 50.317 m. In addition, when the value of the ambisonics reference distance information (gca_bsReferenceDistance) is 39, the ambisonics reference distance information indicates the ambisonics default reference distance.

| gha__bsReferenceDistance | reference distance |
|---|---|
| 0-38 | (reference__distance) = (4 * gha__bsReferenceDistance + 4)/160 * default__reference__distance |
| 39-63 | (reference__distance) = 10^(1/20 * (gha__bsReferenceDistance − 39)) * default__reference__distance |

default__reference__distance = 2^(5/3) m ≈ 3.1748 m

In another specific embodiment, metadata may indicate the reference distance of a channel signal using an exponential function. In the following embodiments to be described, if there is no description contrary to the descriptions of the above-described embodiments, the following embodiments to be described and the above-described embodiments may be applied together.

Specifically, when the value of the channel reference distance information is from 0 to 38, the channel reference distance information may indicate the reference distance of a channel signal according the following equation.

$$\text{Reference distance}=A*[2^{(C*bs\_reference\_distance)}]+B;$$

In this case, it may be that A=2^9, B=2^(5/3)*1000−2^(128/11)≈−8.6220 mm, and C=1/11.

In this case, Reference distance is the reference distance of the channel signal, and the unit of the reference distance is a millimeter (mm). Also, bs_reference_distance represents a value of the channel reference distance information. The channel reference distance information may indicate a distance corresponding to a minimum of 503 mm to a maximum of 27115 mm. In addition, when the value of the channel reference distance information is 29, the channel reference distance information indicates the channel default reference distance.

The channel reference information of the metadata frame (bs_reference_distance) may indicate the reference distance of a channel signal according to the following table.

| bs__reference__distance | reference distance |
|---|---|
| 0-63 | (reference distance) = A*[2^(C*bs__reference__distance)] + B; A = 2^9 B = 2^(5/3)*1000 − 2^(128/11)) ≈ −8.6220 mm C = 1/11 |

In addition, as the reference distance of a channel signal indicated by the channel reference distance information is changed, a method in which the object distance information indicates the distance of an object signal may be changed. The object distance information (position_distance) included in the single dynamic metadata frame may indicate the distance of an object signal according to the following table. In this case, the object distance information (position_distance) may indicate a distance corresponding to a minimum of 0 to a maximum of 167 km.

| position__distance | distance |
|---|---|
| 0 | distance = position__distance |
| 1-254 | distance = A*[2^(C*position__distance)] + B; A = 2^(45/11) B = 2^(5/3)*1000 − 2^(128/11)) ≈ −8.6220 mm C = 1/11 |
| 255 | distance = 167 km |

The object distance information (goa_bsObjectDistance) included in the GOA metadata may indicate the distance of an object signal according to the following table. The object distance information (goa_bsObjectDistance) may indicate a distance corresponding to a minimum of 0 to a maximum of 167 km.

| goa__bsObjectDistance | distance |
|---|---|
| 0 | distance = 0 |
| 1-254 | distance = A*[2^(C*goa__bsObjectDistance)] + B; A = 2^(45/11) B = 2^(5/3)*1000 − 2^(128/11)) ≈ −8.6220 mm C = 1/11 |
| 255 | distance = 167 km |

The channel reference distance information (gca_bsReferenceDistance) included in the GCA metadata may indicate the reference distance of a channel signal according to the following table. The channel reference distance information (gca_bsReferenceDistance) may indicate a distance corresponding to a minimum of 503 mm to a maximum of 27115 mm. In addition, when the value of the channel reference distance information (gca_bsReferenceDistance) is 29, the channel reference distance information indicates the channel default reference distance.

| gca__bsReferenceDistance | reference distance |
|---|---|
| 0-63 | (reference distance) = A*[2^(C*gca__bsReferenceDistance)] + B; A = 2^9 B = 2^(5/3)*1000 − 2^(128/11)) ≈ −8.6220 mm C = 1/11 |

In addition, as the reference distance of a channel signal indicated by the channel reference distance information is changed, a method in which the ambisonics reference distance information indicates the reference distance of an ambisonics signal may be changed. The ambisonics reference distance information (gha_bsReferenceDistance) included in the GHA metadata may indicate the reference distance of an ambisonics signal according to the following table. The ambisonics reference distance information (gha_bsReferenceDistance) may indicate a distance corresponding to a minimum of 503 mm to a maximum of 27115 mm. In addition, when the value of the ambisonics reference distance information (gca_bsReferenceDistance) is 29, the ambisonics reference distance information indicates the ambisonics default reference distance.

| gha__bsReferenceDistance | reference distance |
|---|---|
| 0-63 | (reference distance) = A*[2^(C*gha__bsReferenceDistance)] + B; A = 2^9 B = 2^(5/3)*1000 − 2^(128/11)) ≈ −8.6220 mm C = 1/11 |

However, when following the embodiments, the channel reference distance information indicates the reference distance of a channel signal using an excessively fine quantization interval at a relatively short distance. In another specific embodiment, metadata may indicate the reference distance of a channel signal using an exponential function.

In the following embodiments to be described, if there is no description contrary to the descriptions of the above-described embodiments, the above-described embodiments may be applied.

Specifically, metadata may indicate the reference distance of a channel signal using the following equation.

reference distance=$A*2^{(C*bs\_reference\_distance)}+B$;

In this case, Reference distance is the reference distance of the channel signal. Also, bs_reference_distance represents a value of the channel reference distance information. When the value of the channel reference distance information is 0 to 37, it may be that A=2^(−13/12), B=0, and C=1/12. Also, when the value of the channel reference distance information is 38 to 55, it may be that A=2^(−28/9), B=0, and C=1/9. Also, when the value of the channel reference distance information is 56 to 63, it may be that A=2^(−31/6), B=0, and C=1/6. The channel reference distance information may indicate a distance corresponding to a minimum of 472 mm to a maximum of 40318 mm. In addition, when the value of the channel reference distance information is 33, the channel reference distance information indicates the channel default reference distance.

The channel reference information of the metadata frame (bs_reference_distance) may indicate the reference distance of a channel signal according to the following table.

| bs_reference_distance | reference distance |
| --- | --- |
| 0-37 | (reference_distance) = A*2^(C*bs_reference_distance) + B; A = 2^(−13/12) B = 0 C = 1/12 |
| 38-55 | (reference_distance) = A*2^(C*bs_reference_distance) + B; A = 2^(−28/9) B = 0 C = 1/9 |
| 56-63 | (reference_distance) = A*2^(C*bs_reference_distance) + B; A = 2^(−31/6) B = 0 C = 1/6 |

In addition, as the reference distance of a channel signal indicated by the channel reference distance information is changed, a method in which the object distance information indicates the distance of an object signal may be changed. The object distance information (position_distance) included in the single dynamic metadata frame may indicate the distance of an object signal according to the following table. In this case, the object distance information (position_distance) may indicate a distance corresponding to a minimum of 0 to a maximum of 167 km.

| position_distance | distance |
| --- | --- |
| 0 | distance = 0 |
| 1-8 | distance = A*2^(C*position_distance) + B; A = 2^(−6) B = 0 C = 1/3 |
| 9-32 | distance = A*2^(C*position_distance) + B; A = 2^(−34/9) B = 0 C = 1/18 |
| 33-128 | distance = A*2^(C*position_distance) + B; A = 2^(−10/3) B = 0 C = 1/24 |
| 129-164 | distance = A*2^(C*position_distance) + B; A = 2^(−46/9) B = 0 C = 1/18 |
| 165-188 | distance = A*2^(C*position_distance) + B; A = 2^(−58/6) B = 0 C = 1/12 |
| 189-254 | distance = A*2^(C*position_distance) + B; A = 2^(−76/3) B = 0 C = 1/6 |
| 255 | distance = 167 km |

The object distance information (goa_bsObjectDistance) included in the GOA metadata may indicate the distance of an object signal according to the following table. The object distance information (goa_bsObjectDistance) may indicate a distance corresponding to a minimum of 0 to a maximum of 167 km.

| goa_bsObjectDistance | distance |
| --- | --- |
| 0 | distance = 0 |
| 1-8 | distance = A*2^(C*goa_bsObjectDistance) + B; A = 2^(−6) B = 0 C = 1/3 |
| 9-32 | distance = A*2^(C*goa_bsObjectDistance) + B; A = 2^(−34/9) B = 0 C = 1/18 |
| 33-128 | distance = A*2^( C*goa_bsObjectDistance ) + B; A = 2^(−10/3) B = 0 C = 1/24 |
| 129-164 | distance = A*2^(C*goa_bsObjectDistance) + B; A = 2^(−46/9) B = 0 C = 1/18 |
| 165-188 | distance = A*2^(C*goa_bsObjectDistance) + B; A = 2^(−58/6) B = 0 C = 1/12 |
| 189-254 | distance = A*2^(C*goa_bsObjectDistance) + B; A = 2^(−76/3) B = 0 C = 1/6 |
| 255 | distance = 167 km |

The channel reference distance information (gca_bsReferenceDistance) included in the GCA metadata may indicate the reference distance of a channel signal according to the following table. The channel reference distance information (gca_bsReferenceDistance) may indicate a distance corresponding to a minimum of 472 mm to a maximum of 40318 mm. In addition, when the value of the channel reference distance information (gca_bsReferenceDistance) is 33, the channel reference distance information indicates the channel default reference distance.

| gca_bsReferenceDistance | reference distance |
|---|---|
| 0-37 | distance =<br>A*2^(C*gca_bsReferenceDistance) + B;<br>A = 2^(−13/12)<br>B = 0<br>C = 1/12 |
| 38-55 | distance =<br>A*2^(C*gca_bsReferenceDistance) + B;<br>A = 2^(−28/9)<br>B = 0<br>C = 1/9 |
| 56-63 | distance =<br>A*2^(C*gca_bsReferenceDistance) + B;<br>A = 2^(−31/6)<br>B = 0<br>C = 1/6 |

In addition, as the reference distance of a channel signal indicated by the channel reference distance information is changed, a method in which the ambisonics reference distance information indicates the reference distance of an ambisonics signal may be changed. The ambisonics reference distance information (gha_bsReferenceDistance) included in the GHA metadata may indicate the reference distance of an ambisonics signal according to the following table. The ambisonics reference distance information (gha_bsReferenceDistance) may indicate a distance corresponding to a minimum of 472 mm to a maximum of 40318 mm. In addition, when the value of the ambisonics reference distance information (gha_bsReferenceDistance) is 33, the ambisonics reference distance information indicates the ambisonics default reference distance.

| gha_bsReferenceDistance | reference distance |
|---|---|
| 0-37 | distance =<br>A*2^(C*gha_bsReferenceDistance) + B;<br>A = 2^(−13/12)<br>B = 0<br>C = 1/12 |
| 38-55 | distance =<br>A*2^(C*gha_bsReferenceDistance; + B;<br>A = 2^(−28/9)<br>B = 0<br>C = 1/9 |
| 56-63 | distance =<br>A*2^(C*gha_bsReferenceDistance) + B;<br>A = 2^(−31/6)<br>B = 0<br>C = 1/6 |

In another embodiment of the present invention, metadata may indicate the reference distance of a channel signal using an equation in which a linear function and an exponential function are combined. In this case, in the equation in which the linear function and the exponential function are combined, the characteristics of the linear function may be more reflected than those of the exponential function at a relatively short distance, and the characteristics of the exponential function may be more reflected than the characteristics of the linear function at a relatively long distance. Specifically, the channel reference distance information may indicate the reference distance of a channel signal using the following equation.

$$y=\text{alpha}*b/B\text{ref}*D\text{ref}+(1-\text{alpha})*10\hat{\ }(h*(b-B\text{ref}))*D\text{ref};$$

$$h=\log 10(1/(1-\text{alpha})*(D\max/D\text{ ref}-\text{alpha}*B\max/B\text{ ref}))/(B\max-B\text{ ref});$$

In this case, y is the reference distance of the channel signal, and the unit of the reference distance is a millimeter (mm). Also, the values of Dref, Dmax, and Bmax may be as follows.

$$D\text{ref}=2\hat{\ }(5/3),\ D\max=167000,\ B\max=255$$

In addition, as alpha is set to a value between 0 and 1 in the above equation, the ratio of the characteristic of the exponential function and the characteristic of the linear function may be adjusted. In a specific embodiment, alpha may be 0.65.

As described above, a set of reference distances which may be represented by the channel reference distance information may be a subset of a set of distance values which may be represented by the object distance information. Therefore, in another specific information, metadata may indicate the reference distance of a channel signal using a value obtained by sampling a set of distances which may be represented by the object distance information. This will be described with reference to FIG. 8.

FIG. 8 shows a relationship among a value of channel reference distance information of metadata, a value of object distance information, and the reference distance of a channel signal according to an embodiment of the present invention.

The interval between reference distances indicated by the channel reference distance information of the metadata may be set in consideration of a just-noticable difference (JND). In the following embodiments to be described, if there is no description contrary to the descriptions of the above-described embodiments, the following embodiments to be described and the above-described embodiments may be applied together. Specifically, the interval between the reference distances indicated by the channel reference distance information of the metadata may be set to be equal to or greater than a distance at which the volume of a sound at two points may be different by JND due to sound attenuation. In such an embodiment, the set of reference distances of the channel signal may be sampled from the set of distances of the object signal according to the following code.

```
%% channel
% params
threshold = 0.7; % dB threshold
% 0~25 channel position
isleftvec = 1;
stidx = 129;
inc = 1;
y_g = 20*log10(y); y_dbinc =
diff(y_g); % object Q step
while(isleftvec)
  for idx = stidx:−1:stidx−6
    if (idx == stidx)
      selidx = idx;
    else
      incDB = sum(y_dbinc(idx:stidx));
      if incDB < threshold
        selidx = idx;
      end
    end
  end
  channelidx_lower(inc,1) = stidx;
  channelidx_lower(inc,2) = selidx;
  inc = inc+1;
  stidx = selidx−1;
  if (length(channelidx_lower) > 27)
    isleftvec = 0;
  end
end
channelidx_lower =
fliplr(flipud(channelidx_lower(1:end−1, :)));
% 26~63 channel position = 129~166 object position
```

-continued

```
channelidx_upper = ([129:165] *) *ones(1,2);
channelidx = [channelidx_lower; channelidx_upper];
sampledchannel = y(channelidx(:,1))
```

In addition, in the embodiments, the object distance information may indicate the distance of an object signal using a function in which an exponential function and a linear function are combined. Also, the interval between the reference distances indicated by the channel reference distance information may be set such that the difference in volume of a sound at two points is 0.7 dB due to sound attenuation. FIG. 8 shows a relationship among a value (Bit) of channel reference distance information of metadata, a value of object distance information (Obj_Distance_Index), and the reference distance of a channel signal (Ch_Reference_Distance) in the metadata set accordingly.

The channel reference information of the metadata frame (bs_reference_distance) may indicate the reference distance (reference distance) of a channel signal according to the following table. The channel reference distance information (bs_reference_distance) may indicate a distance corresponding to a minimum of 0.5 m to a maximum of 36.1 m. In addition, when the value of the channel reference distance information (bs_reference_distance) is 26, the channel reference distance information indicates a channel default reference distance of 3.175 m.

| bs_reference_distance | reference distance |
|---|---|
| 0 | reference distance = distance( position_distance = 31 ) |
| 1 | reference distance = distance( 33 ) |
| 2 | reference distance = distance( 35 ) |
| 3 | reference distance = distance( 37 ) |
| 4 | reference distance = distance( 40 ) |
| 5 | reference distance = distance( 43 ) |
| 6 | reference distance = distance( 46 ) |
| 7 | reference distance = drstance( 49 ) |
| 8 | reference distance = distance( 53 ) |
| 9 | reference distance = distance( 57 ) |
| 10 | reference distance = distance( 61 ) |
| 11 | reference distance = distance( 65 ) |
| 12 | reference distance = distance( 70 ) |
| 13 | reference distance = distance( 75 ) |
| 14 | reference distance = distance( 80 ) |
| 15 | reference distance = distance( 86 ) |
| 16 | reference distance = distance( 92 ) |
| 17 | reference distance = distance( 98 ) |
| 18 | reference distance = distance( 103 ) |
| 19 | reference distance = distance( 108 ) |
| 20 | reference distance = distance( 112 ) |
| 21 | reference distance = distance( 116 ) |
| 22 | reference distance = distance( 119 ) |
| 23 | reference distance = distance( 122 ) |
| 24 | reference distance = distance( 124 ) |
| 25 | reference distance = distance( 126 ) |
| 26 | reference distance = distance( 128 ) |
| 27-63 | reference distance = (0.65*( ( bs_reference_distance + 102)/129) + 0.35*10^(0.04108667586401501 * (bs_reference_distance − 27))) * default_reference_distance |

default_reference_distance = 2^( 5/3 ) m ≈ 3.175 m

In addition, as the reference distance of a channel signal indicated by the channel reference distance information is changed, a method in which the object distance information indicates the distance of an object signal may be changed. The object distance information (position_distance) included in the single dynamic metadata frame may indicate the distance of an object signal according to the following table. In this case, the object distance information (position_distance) may indicate a distance corresponding to a minimum of 0 to a maximum of 167 km.

| position_distance | distance |
|---|---|
| 0 | distance = 0 m |
| 1-254 | distance = (0.65*(position_distance/129) + 0.35*10^( 0.04108667586401501 * (position_distance − 129))) * default_reference_distance |
| 255 | distance = 167000 m |

default_reference_distance = 2^( 5/3 ) m ≈ 3.175 m

The object distance information (goa_bsObjectDistance) included in the GOA metadata may indicate the distance of an object signal according to the following table. The object distance information (goa_bsObjectDistance) may indicate a distance corresponding to a minimum of 0 to a maximum of 167 km.

| goa_bsObjectDistance | distance |
|---|---|
| 0 | distance = 0 m |
| 1-254 | distance = (0.65*( goa_bsObjectDistance/129) + 0.35*10^( 0.04108667586401501 * (goa_bsObjectDistance − 129))) * default_reference_distance |
| 255 | distance = 167000 m |

default_reference_distance = 2^( 5/3 ) m ≈ 3.175 m

The channel reference distance information (gca_bsReferenceDistance) included in the GCA metadata may indicate the reference distance of a channel signal according to the following table. The channel reference distance information (gca_bsReferenceDistance) may indicate a distance corresponding to a minimum of 0.5 m to a maximum of 36.1 m. In addition, when the value of the channel reference distance information (gca_bsReferenceDistance) is 26, the channel reference distance information indicates a channel default reference distance of 3.175 m.

| gca_bsReferenceDistance | reference distance |
|---|---|
| 0 | reference distance = distance( position_distance = 31 ) |
| 1 | reference distance = distance( 33 ) |
| 2 | reference distance = distance( 35 ) |
| 3 | reference distance = distance( 37 ) |
| 4 | reference distance = distance( 40 ) |
| 5 | reference distance = distance( 43 ) |
| 6 | reference distance = distance( 46 ) |
| 7 | reference distance = distance( 49 ) |
| 8 | reference distance = distance( 53 ) |
| 9 | reference distance = distance( 57 ) |
| 10 | reference distance = distance( 61 ) |
| 11 | reference distance = distance( 65 ) |
| 12 | reference distance = distance( 70 ) |
| 13 | reference distance = distance( 75 ) |
| 14 | reference distance = distance( 80 ) |
| 15 | reference distance = distance( 86 ) |
| 16 | reference distance = distance( 92 ) |
| 17 | reference distance = distance( 98 ) |
| 18 | reference distance = distance( 103 ) |
| 19 | reference distance = distance( 108 ) |
| 20 | reference distance = distance( 112 ) |
| 21 | reference distance = distance( 116 ) |
| 22 | reference distance = distance( 119 ) |
| 23 | reference distance = distance( 122 ) |
| 24 | reference distance = distance( 124 ) |

-continued

| gca_bsReferenceDistance | reference distance |
|---|---|
| 25 | reference distance = distance( 126 ) |
| 26 | reference distance = distance( 128 ) |
| 27-63 | reference distance = (0.65*((gca_bsReferenceDistance + 102)/ 129) + 0.35*10^(0.04108667586401501 * (gca_bsReferenceDistance − 27))) * default_reference_distance |

default_reference_distance = 2^( 5/3 ) m ≈ 3.175 m

In this case, when the value of the object distance information is x. a distance(x) is a reference distance indicated by the object distance information.

In addition, as the reference distance of a channel signal indicated by the channel reference distance information is changed, a method in which the ambisonics reference distance information indicates the reference distance of an ambisonics signal may be changed. The ambisonics reference distance information (gha_bsReferenceDistance) included in the GHA metadata may indicate the reference distance of an ambisonics signal according to the following table. The ambisonics reference distance information (gha_bsReferenceDistance) may indicate a distance corresponding to a minimum of 0.5 m to a maximum of 36.1 m. In addition, when the value of the ambisonics reference distance information (gcabsReferenceDistance) is 26, the ambisonics reference distance information indicates an ambisonics default reference distance of 3.175 m.

| gha_bsReferenceDistance | reference distance |
|---|---|
| 0 | reference distance = distance( position_distance = 31 ) |
| 1 | reference distance = distance( 33 ) |
| 2 | reference distance = distance( 35 ) |
| 3 | reference distance = distance( 37 ) |
| 4 | reference distance = distance( 40 ) |
| 5 | reference distance = distance( 43 ) |
| 6 | reference distance = distance( 46 ) |
| 7 | reference distance = distance( 49 ) |
| 8 | reference distance = distance( 53 ) |
| 9 | reference distance = distance( 57 ) |
| 10 | reference distance = distance( 61 ) |
| 11 | reference distance = distance( 65 ) |
| 12 | reference distance = distance( 70 ) |
| 13 | reference distance = distance( 75 ) |
| 14 | reference distance = distance( 80 ) |
| 15 | reference distance = distance( 86 ) |
| 16 | reference distance = distance( 92 ) |
| 17 | reference distance = distance( 98 ) |
| 18 | reference distance = distance( 103 ) |
| 19 | reference distance = distance( 108 ) |
| 20 | reference distance = distance( 112 ) |
| 21 | reference distance = distance( 116 ) |
| 22 | reference distance = distance( 119 ) |
| 23 | reference distance = distance( 122 ) |
| 24 | reference distance = distance( 124 ) |
| 25 | reference distance = distance( 126 ) |
| 26 | reference distance = distance( 128 ) |
| 27-63 | reference distance = (0.65*((gha_bsReferenceDistance + 102)/ 129) + 0.35*10^(0.04108667586401501 * (gha_bsReferenceDistance − 27)))* default_reference_distance |

default reference distance = 2^( 5/3 ) m ≈ 3.175 m

In this case, when the value of the object distance information is x. a distance(x) is a reference distance indicated by the object distance information.

In the above-described embodiments, the channel reference distance information and the ambisonics reference distance information are expressed in 6 bits, and the object distance information is expressed in 8 bits. In a specific embodiment, the channel reference distance information and the ambisonics reference distance information are expressed in 7 bits, and the object distance information may be expressed in 9 bits.

Even when the channel reference distance information of the metadata is expressed in 8 bits, the above-described embodiments may be applied. Specifically, the metadata may indicate a channel reference distance using an exponential function. Specifically, the channel reference distance information may determine the value of an exponent of the corresponding exponential function.

A set of reference distance values of a channel signal may be a subset of a set of reference distance values of an object signal. The minimum distance which may be indicated by the channel reference distance information may be a predetermined positive number greater than 0. In this case, the minimum distance may be 0.5 m. In addition, the renderer may apply a channel default reference distance to a channel signal whose channel reference distance information is not defined. In this case, the channel default reference distance may be a predetermined value. The predetermined value may be the same as the object default distance. Specifically, the predetermined value may be 3.1748 m.

In a specific embodiment, the channel reference distance information may indicate the reference distance of a channel signal using the following equation.

$$\text{Reference distance}=0.01*2^{(0.0472188798661443*(bs\_\text{Reference\_Distance}+119))}$$

In this case, Reference distance is the reference distance of the channel signal, and the unit of the reference distance is a meter (m). bs_Reference_Distance is a value of the channel reference distance information.

Such embodiments for the channel reference distance information may be applied to the ambisonics reference distance information. A syntax of the metadata applied to the above embodiments will be described with reference to FIG. 9 to FIG. 12. In the following description, unless stated otherwise, the above-described embodiments may be applied together.

FIG. 9 shows a syntax of a metadata configuration indicating a metadata-related setting according another embodiment of the present invention.

As described above, the channel reference distance information may be expressed in 7 bits. Therefore, the channel reference distance information (bs_reference_distance) of the metadata configuration may be indicated through 7 bits. Also, the value of the channel reference distance information (bs_reference_distance) indicating the channel default reference distance may be 57. This will be described again later. The channel reference distance information (bs_reference_distance) may indicate the reference distance (reference distance) of a channel signal according to the following table.

| bs_reference_distance | reference distance |
|---|---|
| 0-127 | reference distance = 0.01 * 2^(0.0472188798661443*( bs_reference_distance + 119)) |

A portion of the syntax of the metadata configuration not described above may be applied by the embodiment described with reference to FIG. 4.

FIG. 10 shows a syntax of the intracoded metadata frame (intracodedProdMetadataFrame) according to another embodiment of the present invention.

As described above, the object distance information may be expressed in 9 bits. Therefore, the object distance information (position_distance) of the intracoded metadata frame (intracodedProdMetadataFrame) may be indicated through 9 bits. In addition, an object default distance (default_distance) is also indicated through 9 bits.

The object default distance (default_distance) may indicate the distance (distance) of an object signal according to the following table.

| position_distance | distance |
|---|---|
| 0 | distance = 0 m |
| 1-511 | distance = 0.01 *2^(0.0472188798661443 * (position_distance − 1)) |

A portion of the syntax of the intracoded metadata frame (intracodedProdMetadataFrame) not described above may be applied by the embodiment described with reference to FIG. 5.

FIG. 11 shows a syntax of the single dynamic metadata frame (singleDynamicProdMetadataFrame) according to an embodiment of the present invention.

The object distance information (position_distance) of the single dynamic metadata frame (singleDynamicProdMetadataFrame) may also be indicated through 9 bits. A portion of the syntax of the single dynamic metadata frame (singleDynamicProdMetadataFrame) not described above may be applied by the embodiment described with reference to FIG. 6.

FIG. 12 shows GOA metadata, which is metadata of an object signal, GCA metadata, which is metadata of a channel signal, and GHA metadata which is metadata of an ambisonics signal, which are used by an external renderer not defined according to the MPEG-H 3D Audio standard according to another embodiment of the present invention;

FIG. 12(*a*) shows the GOA metadata. The object distance information (goa_bsObjectDistance) may be indicated by 9 bits. The object distance information (goa_bsObjectDistance) included in the GOA metadata may indicate the distance of an object signal according to the following table. In this case, the object distance information (goa_bsObjectDistance) may indicate a distance corresponding to a minimum of 0 to a maximum of 167 km.

| goa_bsObjectDistance | distance |
|---|---|
| 0 | distance = 0 m |
| 1-511 | distance = 0.01 * 2^(0.0472188798661443 * (goa_bsObjectDistance − 1)) |

FIG. 12(*b*) shows the GCA metadata. The channel reference distance information of the GCA metadata (gca_bsReferenceDistance) indicates a value other than the channel default reference distance. The channel reference distance information (gca_bsReferenceDistance) may be indicated by 7 bits. The channel reference distance information (gca_bsReferenceDistance) included in the GCA metadata may indicate the reference distance of a channel signal according to the following table.

| gca_bsReferenceDistance | reference distance |
|---|---|
| 0-127 | reference distance = 0.01 * 2^(0.0472188798661443 * (gca_bsReferenceDistance + 119)) |

FIG. 12(*c*) shows the GHA metadata. The ambisonics reference distance information of the GHA metadata (gha_bsReferenceDistance) may be indicated by 7 bits. The ambisonics reference distance information (gha_bsReferenceDistance) included in the GHA metadata may indicate the reference distance of an ambisonics signal according to the following table.

| gha_bsReferenceDistance | reference distance |
|---|---|
| 0-127 | reference distance = 0.01 * 2^( 0.0472188798661443 * (gha_bsReferenceDistance + 119)) |

Figure 13:
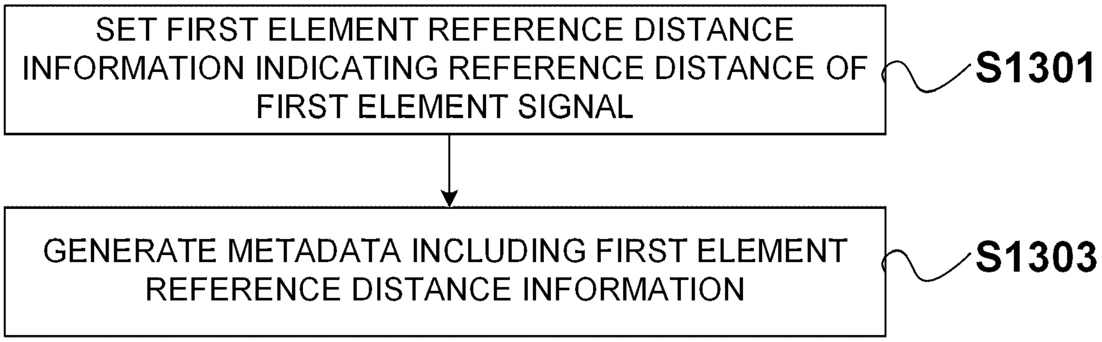
FIG. 13 shows an operation of generating metadata by an audio signal processing device encoding an audio signal including a first element signal according to an embodiment of the present invention.

FIG. 13 shows an operation of generating metadata by an audio signal processing device encoding an audio signal including a first element signal according to an embodiment of the present invention.

The audio signal processing device sets first element reference distance information indicating the reference distance of the first element signal S1301. The audio signal processing device generates metadata including the first element reference distance information S1303. In this case, the audio signal is capable of including a second element signal. In addition, the metadata is capable of including second element distance information indicating the distance of the second element signal. In this case, the number of bits used for indicating the first element reference distance information may be smaller than the number of bits used for indicating the second element distance information. Specifically, the number of bits required to represent the first element reference distance information may be 7, and the number of bits required to represent the second element distance information may be 9. In addition, the first element signal may be a channel signal, and the second element signal may be an object signal. In addition, the first element signal may be an ambisonics signal, and the second element signal may be an object signal.

A set of reference distances which may be represented by the first element reference distance information may be a subset of a set of distances which may be represented by the second element distance information. Through the above, the number of reference distances and distances to be considered by a renderer to support rendering of the first element signal and the second element signal may be reduced. Therefore, through the above embodiment, rendering efficiency may be increased.

To a method for indicating the first element reference distance information, embodiments related to the method for indicating the reference distance of a channel signal and embodiments related to the method for indicating the reference distance of an ambisonics signal described with reference to FIG. 3 to FIG. 12 may be applied. In addition, to a method for indicating the second element distance information, embodiments related to the method for indicating the distance of an object signal described with reference to FIG. 3 to FIG. 12 may be applied.

Specifically, the first element reference distance information may indicate the reference distance of the first element signal using an exponential function. Specifically, the first element reference distance information may determine the value of an exponent of the exponential function. In a specific embodiment, the first element reference distance information may indicate the reference distance of the first element signal using the following equation. The audio signal processing device may set the value of the first element reference distance information such that the first element reference distance information indicates the reference distance of the first element using the following equation.

$$\text{Reference distance}=0.01*2^{\wedge}(0.0472188798661443*(bs\_\text{Reference\_Distance}+119))$$

In this case, Reference distance is the reference distance of the first element signal, and the unit of the reference distance of the first element signal is a meter (m). In addition, bs_Reference_Distance is the first element reference distance information, and the value of the first element reference distance information is an integer of 0 to 127.

A value which may be represented by the second element distance information may be an integer of 0 to 511. When the value of the second element distance information is 0, the second element distance information may indicate that the distance of the second element signal is 0. When the distance of the second element signal is 0, the audio signal processing device may set the value of the second element distance information to 0. When the value of the second element distance information is 1 to 511, the second element distance information may indicate that the distance of the second element signal using the following equation. When the distance of the second element signal is not 0, the audio signal processing device may set the value of the second element distance information such that the second element reference distance information indicates the distance of the second element signal according to the following equation.

$$\text{Distance}=0.01*2^{\wedge}(0.0472188798661443*(\text{Position\_Distance}-1))$$

Distance is the distance of the second element signal, and the unit of the distance of the second element signal may be a meter (m). In addition, Position_Distance is the second element distance information, and the value of the second element distance information is an integer of 1 to 511.

If the first element reference distance information is not defined, the audio signal processing device may assume that the first element reference distance information indicates a first element default reference distance. In addition, when the second element distance information is not defined, the audio signal processing device may assume that the second element distance information indicates a second element default distance. The first element default reference distance and the second element default distance may have the same value.

The minimum reference distance which may be indicated by the first element reference distance information may be a predetermined positive number greater than 0. In this case, the minimum distance which may be indicated by the second element distance information may be 0. Through the above, the number of bits required to represent the first element reference distance information may be reduced by indicating a distance by one value, the distance being equal to or less than the predetermined distance and having an insignificant influence of the reference distance.

Figure 14:
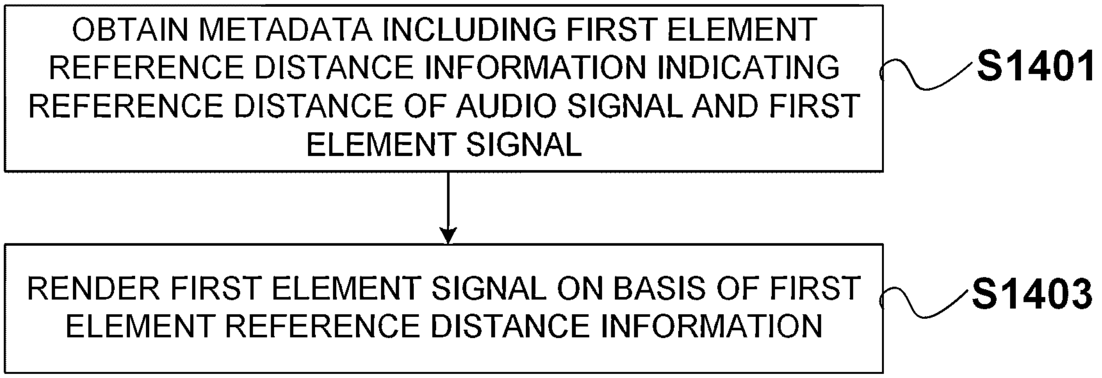
FIG. 14 shows an operation of rendering a first element signal by an audio signal processing device rendering an audio signal including the first element signal according to an embodiment of the present invention.

FIG. 14 shows an operation of rendering a first element signal by an audio signal processing device rendering an audio signal including the first element signal according to an embodiment of the present invention.

The audio signal processing device obtains metadata including first element reference distance information indicating the reference distance of the audio signal and the first element signal S1401. In this case, the audio signal is capable of including a second element signal. In addition, the metadata is capable of including second element distance information indicating the distance of the second element signal. In this case, the number of bits used for indicating the first element reference distance information may be smaller than the number of bits used for indicating information on the distance of the second element. Specifically, the number of bits required to represent the first element reference distance information may be 7, and the number of bits required to represent the second element distance information may be 9. In addition, the first element signal may be a channel signal, and the second element signal may be an object signal. In addition, the first element signal may be an ambisonics signal, and the second element signal may be an object signal.

A set of reference distances represented by the first element reference distance information may be a subset of a set of distances represented by the information on the distance of the second element. Through the above, the number of reference distances to be considered by a renderer to support rendering of the first element signal and the second element signal may be reduced. Therefore, through the above embodiment, rendering efficiency may be increased.

To a method for indicating the first element reference distance information, embodiments related to the method for indicating the reference distance of a channel signal and embodiments related to the method for indicating the reference distance of an ambisonics signal described with reference to FIG. 3 to FIG. 12 may be applied. In addition, to a method for indicating the second element distance information, embodiments related to the method for indicating the distance of an object signal described with reference to FIG. 3 to FIG. 12 may be applied.

Specifically, the first element reference distance information may indicate the reference distance of the first element signal using an exponential function. Specifically, the first element reference distance information may determine the value of an exponent of the exponential function. In a specific embodiment, the first element reference distance information may indicate the reference distance of the first element signal using the following equation. The audio signal processing device may obtain the reference distance of the first element signal according to the following equation.

$$\text{Reference distance}=0.01*2^{\wedge}(0.0472188798661443*(bs\_\text{Reference\_Distance}+119))$$

In this case, Reference distance is the reference distance of the first element signal, and the unit of the reference distance of the first element signal is a meter (m). In addition, bs_Reference_Distance is the first element reference distance information, and the value of the first element reference distance information is an integer of 0 to 127.

A value which may be represented by the second element distance information is an integer of 0 to 511. When the value of the second element distance information is 0, the second element distance information may indicate that the distance of the second element signal is 0. When the value of the second element distance information is 0, the audio signal processing device may determine that the distance of the second element signal is 0. In this case, when the value of the second element distance information is 1 to 511, the second element distance information may indicate that the distance of the second element signal using the following equation. When the value of the second element distance information is an integer of 1 to 511, the audio signal processing device may obtain the distance of the second element signal according to the following equation.

$$\text{Distance}=0.01*2\hat{}(0.0472188798661443*(\text{Position\_Distance}-1))$$

Distance is the distance of the second element signal, and the unit of the distance of the second element signal may be a meter (m). Also, Position_Distance is the second element distance information. The value of the second element distance information is an integer of 0 to 511.

If the first element reference distance information is not defined, the audio signal processing device may assume that the first element reference distance information indicates a first element default reference distance. In addition, when the second element distance information is not defined, the audio signal processing device may assume that the second element distance information indicates a second element default distance. The first element default reference distance and the second element default distance may have the same value.

The minimum reference distance which may be indicated by the first element reference distance information may be a predetermined positive number greater than 0. In this case, the minimum distance which may be indicated by the second element distance information may be 0. Through the above, the number of bits required to represent the first element reference distance information may be reduced by indicating a distance by one value, the distance being equal to or less than the predetermined distance and having an insignificant influence of the reference distance.

The audio signal processing device renders the first element signal based on the first element reference distance information S1403. Specifically, the audio signal processing device may adjust, based on the first element reference distance information, the loudness of a sound in which the first element signal is rendered. The audio signal processing device may render the first element signal and the second element signal, simultaneously. The audio signal processing device may output a sound rendered from the first element signal and a sound rendered from the second element signal, simultaneously. The audio signal processing device may adjust, based on the first element reference distance information and the second element distance information, the loudness of a sound output in which the first element signal is rendered and the loudness of a sound output in which the second element signal is rendered. Through the above, the audio signal processing device may adjust the balance between the loudness of the sound output in which the first element signal is rendered and the loudness of the sound output in which the second element signal is rendered.

Also, the audio signal processing device may apply a delay to the first element signal based on the first element reference distance information. The audio signal processing device may render the first element signal and the second element signal, simultaneously. In this case, the audio signal processing device may apply a delay to each of the first element signal and the second element signal based on the first element reference distance information and the second element distance information to adjust sound delay time. This is because the sense of distance which may be felt by a listener is changed according to the reference distance of the first element signal and the distance of the second element signal.

In addition, the audio signal may include both an ambisonics signal and a channel signal. In this case, the audio signal processing device may render the ambisonics signal and the channel signal simultaneously using one piece of reference distance information. Specifically, the audio signal processing device may render the ambisonics signal and the channel signal simultaneously using the same reference distance. In another specific embodiment, an audio signal processing device may render an ambisonics signal and a channel signal by applying different reference distances thereto. In this case, sound field correction and loudness correction may be performed according to the difference in reference distance. Also, different delays may be applied according to the difference in reference distance to adjust sound delay time. In another specific embodiment, an audio signal processing device may render a channel signal based on channel reference distance information and render an ambisonics signal based on ambisonics reference distance information. Also, the audio signal processing device may render a second element signal based on first element reference distance information.

Although the present invention has been described with reference to specific embodiments, it will be apparent to those skilled in the art that modifications and variations may be made without departing from the spirit and scope of the present invention. That is, although the present invention has been described with respect to an embodiment of processing a multi-audio signal, the present invention may be equally applied and extended to various multimedia signals including video signals as well as audio signals. Therefore, it is interpreted that what may be easily inferred by a person belonging to the technical field to which the present invention belongs belongs to the scope of the present invention from the detailed description and embodiments of the present invention.

The invention claimed is:

1. An audio signal processing device rendering an audio signal including a first element signal, the device comprising a processor for obtaining the audio signal including the first element signal and metadata including a first element reference distance information indicating a reference distance of the first element signal, and rendering the first element signal on the basis of the first element reference distance information, wherein:

the audio signal including the first element signal includes a second element signal which is simultaneously rendered with the first element signal;

the metadata is able to include second element distance information indicating a distance of the second element signal;

a number of bits required for representing the first element reference distance information is smaller than a number of bits required for representing the second element distance information;

a set of reference distances which is able to be represented by the first element reference distance information is a subset of a set of distances which is able to be represented by the second element distance information, the first element signal is a channel signal or an ambisonics signal, and the second element signal is an object signal, and the reference distance of the first element signal represents a radius of a circumference of a speaker layout required to render the first element signal when a listener is position in a sweet spot in a virtual space expressed by the first element signal, wherein a minimum reference distance which is able to be indicated by the first element reference distance information is a predetermined positive number greater than 0.

2. The audio signal processing device of claim 1, wherein the first element reference distance information indicates the reference distance of the first element signal using an exponential function.

3. The audio signal processing device of claim 2, wherein the first element reference distance information determines a value of an exponent of the exponential function.

4. The audio signal processing device of claim 3, wherein the number of bits required for representing the first element reference distance information is 7, and the number of bits required for representing the second element distance information is 9.

5. The audio signal processing device of claim 4, wherein the processor obtains the reference distance of the first element signal from the first element reference distance information using a following equation:

$$\text{Reference distance}=0.01*2^{(0.0472188798661443*(bs\_\text{Reference\_Distance}+119))}$$

wherein Reference distance is the reference distance of the first element signal, a unit of the reference distance of the first element signal is a meter (m), bs_Reference_Distance is the first element reference distance information, and a value of the first element reference distance information is an integer of 0 to 127.

6. The audio signal processing device of claim 5, wherein a value which is able to be represented by the second element distance information is an integer of 0 to 511, and the processor determines, when the value of the second element distance information is 0, that the distance of the second element signal is 0, and obtains, when the value of the second element distance information is 1 to 511, the distance of the second element signal from the second element distance information using a following equation:

$$\text{Distance}=0.01*2^{(0.0472188798661443*(\text{Position\_Distance}-1))}$$

wherein Distance is the distance of the second element signal, a unit of the distance of the second element signal is a meter (m), and Position_Distance is the second element distance information.

7. The audio signal processing device of claim 1, wherein the processor assumes, when the first element reference distance information is not defined, that the first element reference distance information indicates a first element default reference distance, and assumes, when the second element distance information is not defined, that the second element distance information indicates a second element default distance, and the first element default reference distance and the second element default distance have the same value.

8. The audio signal processing device of claim 1, wherein the processor adjusts, on the basis of the first element reference distance information, a loudness of a sound output in which the first element signal is rendered, and adjusts, on the basis of the second element distance information, a loudness of a sound output in which the second element signal is rendered.

9. The audio signal processing device of claim 1, wherein the processor applies a delay to the first element signal on the basis of the first element reference distance information, and applies a delay to the second element signal on the basis of the second element distance information.

10. The audio signal processing device of claim 1, wherein the processor renders the second element signal on the basis of the first element reference distance information.

11. An audio signal processing device encoding an audio signal including a first element signal, the device comprising a processor for setting first element reference distance information indicating a reference distance of the first element signal and generating metadata including the first element reference distance information, wherein:

the audio signal further includes a second element signal;

the metadata is able to include second element distance information indicating a distance of the second element signal, a number of bits used for indicating the first element reference distance information is smaller than a number of bits used for indicating the second element distance information, a set of reference distances which is able to be represented by the first element reference distance information is a subset of a set of distances which is able to be represented by the second element distance information, the first element signal is a channel signal or an ambisonics signal, and the second element signal is an object signal, and the reference distance of the first element signal represents a radius of a circumference of a speaker layout required to render the first element signal when a listener is position in a sweet spot in a virtual space expressed by the first element signal, wherein a minimum reference distance which is able to be indicated by the first element reference distance information is a predetermined positive number greater than 0.

12. The audio signal processing device of claim 11, wherein the first element reference distance information indicates the reference distance of the first element signal using an exponential function.

13. The audio signal processing device of claim 12, wherein the first element reference distance information determines a value of an exponent of the exponential function.

14. The audio signal processing device of claim 13, wherein the number of bits required for representing the first element reference distance information is 7, and the number of bits required for representing the second element distance information is 9.

15. The audio signal processing device of claim 14, wherein the processor sets a value of the first element reference distance information such that the first element reference distance information indicates the reference distance of the first element signal according to a following equation:

$$\text{Reference distance}=0.01*2\hat{\ }(0.0472188798661443*(bs\_\text{Reference\_Distance}+119))$$

wherein Reference distance is the reference distance of the first element signal, a unit of the reference distance of the first element signal is a meter (m), bs_Reference_Distance is the first element reference distance information, and the value of the first element reference distance information is an integer of 0 to 127.

16. The audio signal processing device of claim 15, wherein a value which is able to be represented by the second element distance information is an integer of 0 to 511, and the processor sets, when the distance of the second element signal is 0, the value of the second element distance information to 0, and sets, when the distance of the second element signal is not 0, the value of the second element distance information such that the second element distance information indicates the distance of the second element signal according to a following equation:

$$\text{Distance}=0.01*2\hat{\ }(0.0472188798661443*(\text{Position\_Distance}-1))$$

wherein Distance is the reference distance of the second element signal, a unit of the distance of the second element signal is a meter (m), Position_Distance is the second element distance information, and the value of the second element distance information is an integer of 1 to 511.

17. The audio signal processing device of claim 11, wherein it is assumed, when the first element reference distance information is not defined, that the first element reference distance information indicates a first element default reference distance, it is assumed, when the second element distance information is not defined, that the second element distance information indicates a second element default distance, and the first element default reference distance and the second element default distance have the same value.

* * * * *